United States Patent
Suzuki et al.

(10) Patent No.: US 12,059,885 B2
(45) Date of Patent: Aug. 13, 2024

(54) DECORATIVE SHEET, COVER PANEL, AND DISPLAY DEVICE

(71) Applicant: NISSHA CO., LTD., Kyoto (JP)

(72) Inventors: Kenichiro Suzuki, Kyoto (JP); Takuya Yoshinaga, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 18/560,040

(22) PCT Filed: May 26, 2022

(86) PCT No.: PCT/JP2022/021546
§ 371 (c)(1),
(2) Date: Nov. 9, 2023

(87) PCT Pub. No.: WO2022/250110
PCT Pub. Date: Dec. 1, 2022

(65) Prior Publication Data
US 2024/0227349 A1    Jul. 11, 2024

(30) Foreign Application Priority Data

May 27, 2021 (JP) ................................. 2021-088953
May 24, 2022 (JP) ................................. 2022-084793

(51) Int. Cl.
*B32B 7/023* (2019.01)
*G02B 5/22* (2006.01)
*G02B 5/26* (2006.01)

(52) U.S. Cl.
CPC ............... *B32B 7/023* (2019.01); *G02B 5/22* (2013.01); *G02B 5/26* (2013.01); *B32B 2307/4026* (2013.01)

(58) Field of Classification Search
CPC ..... B32B 7/00–7/14; G02B 5/22; G02B 5/26; G09F 9/30; G09F 13/04; G09F 19/12
See application file for complete search history.

(56) References Cited

U.S. PATENT DOCUMENTS

2017/0282716 A1* 10/2017 Mochizuki ............. B60K 35/00

FOREIGN PATENT DOCUMENTS

JP        H09254520 A    9/1997
JP        2015120304 A   7/2015
(Continued)

OTHER PUBLICATIONS

Machine translation of JPH09-254520. Retrieved Jun. 6, 2024.*
Machine translation of JP2015-120304. Retrieved Jun. 6, 2024.*

*Primary Examiner* — Prashant J Khatri
(74) *Attorney, Agent, or Firm* — Alleman Hall & Tuttle LLP

(57) ABSTRACT

A decorative sheet has a pattern formed with an interference pigment and is more versatile with reduced coloration specific to the interference pigment. A patterned layer has a pattern formed with an interference pigment to produce a color by interference of reflected light reflected after being incident as incident light on a front surface of the patterned layer. A front color-adjustment layer covers the front surface of the patterned layer and transmits the incident light, incident light, and the reflected light. A base film supports the patterned layer and the front color-adjustment layer. The front color-adjustment layer contains particles of a front absorbing pigment dispersed uniformly across the front color-adjustment layer. The front color-adjustment layer with the front absorbing pigment reduces a spectral component in a predetermined wavelength range of the incident light and the reflected light transmitted through the front color-adjustment layer.

11 Claims, 19 Drawing Sheets

(56) References Cited

FOREIGN PATENT DOCUMENTS

| JP | 2017187477 | A | | 10/2017 |
|----|------------|---|---|---------|
| JP | 6839319 | B1 | | 3/2021 |
| KR | 20180000368 | U | * | 2/2018 |

* cited by examiner

FIG. 7

| | Thickness | Transmittance | Transmitted color (x, y) | Δx, Δy |
|---|---|---|---|---|
| Front color-adjustment layer | 1–2 μm | 72% | 0.341, 0.345 | 0.027, 0.014 |
| Patterned layer | 2–3 μm | 89% | 0.316, 0.333 | 0.002, 0.002 |
| Back color-adjustment layer | 1–2 μm | 35% | 0.288, 0.315 | −0.026, −0.016 |
| Overlap between color-adjustment layers | | 27% | 0.311, 0.328 | −0.003, −0.003 |
| Overlap between color-adjustment layers and patterned layer | | 24% | 0.312, 0.323 | −0.002, −0.002 |
| Light source color | | | 0.314, 0.331 | Target |

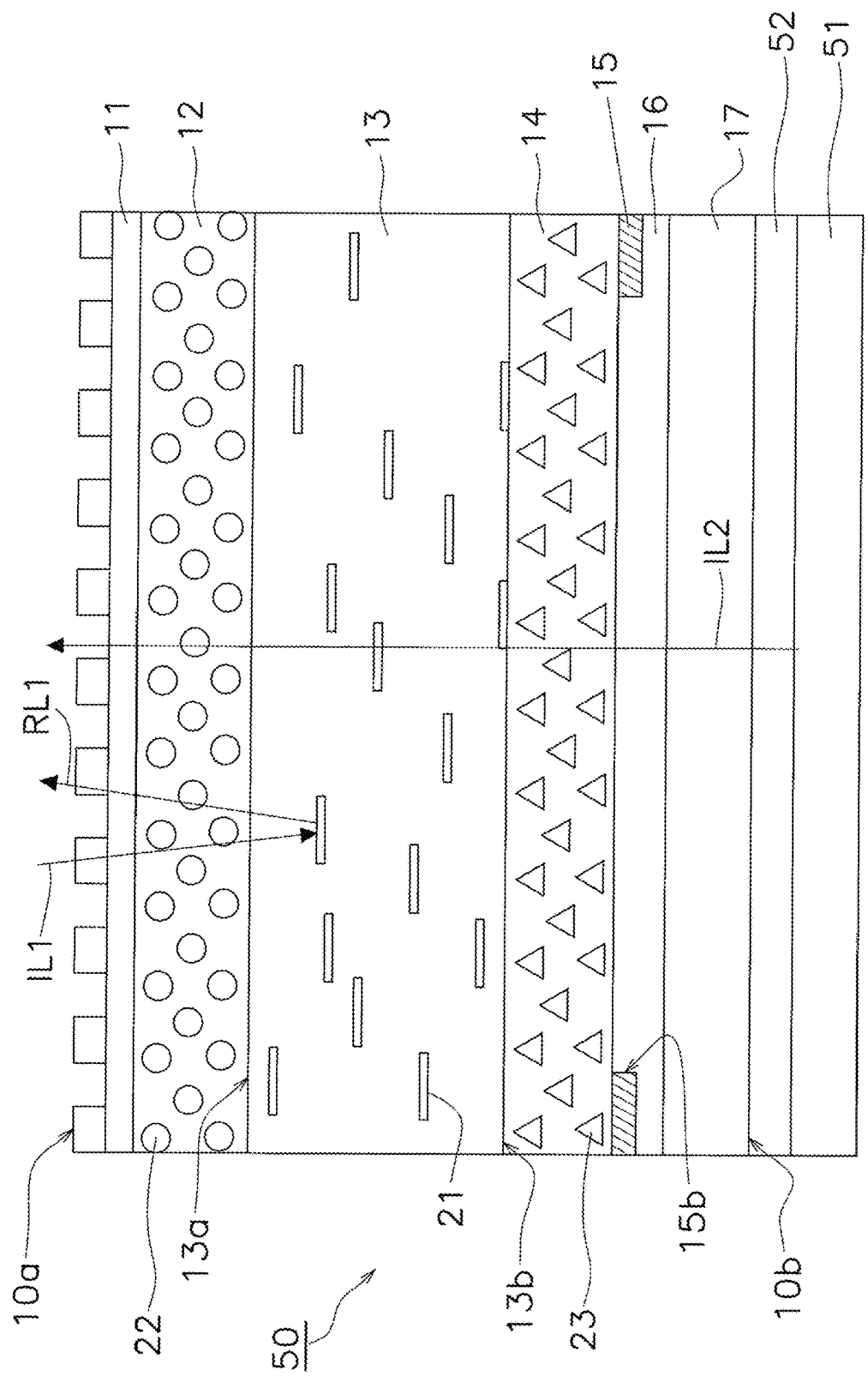

DECORATIVE SHEET, COVER PANEL, AND DISPLAY DEVICE

TECHNICAL FIELD

The present invention relates to a decorative sheet, a cover panel, and a display device having a pattern formed with an interference pigment.

BACKGROUND

A decorative sheet for in-mold decoration containing interference pigments (also referred to as optical interference pigments) is described in, for example, Patent Literature 1 (Japanese Patent No. 6839319). As described in Patent Literature 1, the interference pigments produce different colors by interference of light reflected from the pigments, thus providing a variety of colors. Interference pigments that produce different colors can be mixed to produce a greater variety of colors. For example, a red interference pigment can be mixed with a blue interference pigment to produce purple.

CITATION LIST

Patent Literature

Patent Literature 1: Japanese Patent No. 6839319

BRIEF SUMMARY

Technical Problem

To display different images with a decorative sheet using reflected light and transmitted light as described in Patent Literature 1, interference pigments that are less likely to color the transmitted light can be more useful than absorbing pigments.

However, interference pigments, which produce colors using interference of reflected light, can have different color tones depending on the angle at which the pigments are viewed. Patterns formed with interference pigments that use interference of light tend to have a pearlier luster to the viewer than patterns formed with absorbing pigments that produce colors by absorbing light at predetermined wavelengths. Although such coloration specific to interference pigments may be useful, the appearance of interference pigments different from known typical absorbing pigments can be unintended.

One or more aspects of the present invention are directed to a decorative sheet having a pattern formed with an interference pigment and being more versatile with reduced coloration specific to the interference pigment. One or more aspects of the present invention are also directed to a cover panel and a display device including the decorative sheet.

Solution to Problem

In response to the above issue, aspects of the present invention will now be described. Any of these aspects may be combined as appropriate.

A decorative sheet according to an aspect of the present invention includes a patterned layer, a front color-adjustment layer, and a base film. The patterned layer transmits light from a back surface to a front surface of the patterned layer. The patterned layer has a pattern formed with an interference pigment to produce a color by interference of light reflected after being incident on the front surface of the patterned layer. The front color-adjustment layer covers the front surface of the patterned layer and transmits light. The base film supports the patterned layer and the front color-adjustment layer. The front color-adjustment layer contains particles of a front absorbing pigment dispersed uniformly across the front color-adjustment layer. The front color-adjustment layer with the front absorbing pigment reduces a spectral component in a predetermined wavelength range of light transmitted through the front color-adjustment layer.

In the decorative sheet with this structure, the absorbing pigment in the front color-adjustment layer reduces pearly luster of the pattern created by the interference pigment. The front color-adjustment layer, which reduces the spectral component in the predetermined range, can reduce the likelihood that the viewer perceives a change in the color tone of the pattern when viewing the pattern at different angles.

The decorative sheet according to the above aspect may further include a back color-adjustment layer covering the back surface of the patterned layer to transmit light. The back color-adjustment layer may contain particles of a back absorbing pigment dispersed uniformly across the back color-adjustment layer. The back absorbing pigment may have a light-absorbing property to cause light transmitted through the back color-adjustment layer and the front color-adjustment layer to have a color closer to an achromatic color than when the light is transmitted through the front color-adjustment layer excluding the back color-adjustment layer.

In the decorative sheet with this structure, the light transmitted from the back surface to the front surface of the patterned layer can be colored by the front color-adjustment layer and have a color shifted from the light source color or have a tint unintended by the user. In response to this, the back absorbing pigment in the back color-adjustment layer changes the color of light transmitted through the back color-adjustment layer and the front color-adjustment layer to be closer to an achromatic color than when the light is transmitted through the front color-adjustment layer excluding the back color-adjustment layer. This reduces unintended coloration caused by the front color-adjustment layer.

The decorative sheet according to the above aspect may further include a back color-adjustment layer covering the back surface of the patterned layer to transmit light. The back color-adjustment layer may contain particles of a back absorbing pigment dispersed uniformly across the back color-adjustment layer. The front color-adjustment layer and the back color-adjustment layer may have complementary colors.

In the decorative sheet with this structure, the light transmitted from the back surface to the front surface of the patterned layer can be colored by the front color-adjustment layer and have a color shifted from the light source color or have a tint unintended by the user. In response to this, the back color-adjustment layer and the front color-adjustment layer cause light transmitted through these layers to have an achromatic color. This reduces unintended coloration of light transmitted from the back surface to the front surface of the patterned layer.

The decorative sheet according to the above aspect may further include a back color-adjustment layer covering the back surface of the patterned layer to transmit light. The back color-adjustment layer may contain particles of a back absorbing pigment dispersed uniformly across the back color-adjustment layer. The back absorbing pigment may have a light-absorbing property to cause light transmitted through the back color-adjustment layer, the patterned layer, and the front color-adjustment layer at a predetermined position to be indicated by a point (x, y) satisfying 0.28≤x≤0.36 and 0.28≤y≤0.36 on an xy chromaticity diagram.

In the decorative sheet with this structure, the white light transmitted from the back surface to the front surface of the patterned layer can be colored in a color other than white by the front color-adjustment layer. In response to this, the back absorbing pigment causes light transmitted through the back color-adjustment layer, the patterned layer, and the front color-adjustment layer at the predetermined position to be indicated by a point (x, y) satisfying 0.28≤x≤0.36 and 0.28≤y≤0.36 on the xy chromaticity diagram. This reduces coloration, in a color other than white, of light transmitted through the back color-adjustment layer, the patterned layer, and the front color-adjustment layer.

A decorative sheet according to another aspect of the present invention includes a patterned layer, a back color-adjustment layer, and a base film. The patterned layer transmits light from a back surface to a front surface of the patterned layer. The patterned layer has a pattern formed with an interference pigment to produce a color by interference of light reflected after being incident on the front surface of the patterned layer. The back color-adjustment layer covers the back surface of the patterned layer and transmits light. The base film supports the patterned layer and the back color-adjustment layer. The back color-adjustment layer contains particles of a back absorbing pigment dispersed uniformly across the back color-adjustment layer. The back absorbing pigment has a light-absorbing property to cause light transmitted through the back color-adjustment layer and the patterned layer at a predetermined position to be indicated by a point (x, y) satisfying 0.28≤x≤0.36 and 0.28≤y≤0.36 on an xy chromaticity diagram.

In the decorative sheet with this structure, the white light transmitted from the back surface to the front surface of the patterned layer can be colored in the ground color of the patterned layer. In response to this, the back absorbing pigment causes light transmitted through the back color-adjustment layer and the patterned layer at the predetermined position to be indicated by a point (x, y) satisfying 0.28≤x≤0.36 and 0.28≤y≤0.36 on the xy chromaticity diagram. This reduces coloration, in a color other than white, of light transmitted through the back color-adjustment layer and the patterned layer.

A cover panel according to an aspect of the present invention includes a patterned layer, a front color-adjustment layer, and a molded member. The patterned layer transmits light from a back surface to a front surface of the patterned layer. The patterned layer has a pattern formed with an interference pigment to produce a color by interference of light reflected after being incident on the front surface of the patterned layer. The front color-adjustment layer covers the front surface of the patterned layer and transmits light. The molded member supports the patterned layer and the front color-adjustment layer. The molded member transmits light. The front color-adjustment layer contains particles of a front absorbing pigment dispersed uniformly across the front color-adjustment layer. The front color-adjustment layer with the front absorbing pigment reduces a spectral component in a predetermined wavelength range of light transmitted through the front color-adjustment layer.

In the cover panel with this structure, the absorbing pigment in the front color-adjustment layer reduces luster of the pattern created by the interference pigment. The front color-adjustment layer, which reduces the spectral component in the predetermined range, can reduce the likelihood that the viewer perceives a change in the color tone of the pattern when viewing the pattern at different angles.

The cover panel according to the above aspect may further include a back color-adjustment layer covering the back surface of the patterned layer to transmit light. The back color-adjustment layer may contain particles of a back absorbing pigment dispersed uniformly across the back color-adjustment layer. The back absorbing pigment may have a light-absorbing property to cause light transmitted to a front of the cover panel at a predetermined position to be indicated by a point (x, y) satisfying 0.28≤x≤0.36 and 0.28≤y≤0.36 on an xy chromaticity diagram.

In the cover panel with this structure, the white light transmitted from the back surface to the front surface of the patterned layer can be colored in a color other than white by, for example, the molded member, the back color-adjustment layer, the patterned layer, and the front color-adjustment layer. In response to this, the back absorbing pigment causes light transmitted to the front of the cover panel at the predetermined position to be indicated by a point (x, y) satisfying 0.28≤x≤0.36 and 0.28≤y≤0.36 on the xy chromaticity diagram. This reduces coloration, in a color other than white, of light transmitted through the cover panel.

A cover panel according to another aspect of the present invention includes a patterned layer, a back color-adjustment layer, and a molded member. The patterned layer transmits light from a back surface to a front surface of the patterned layer. The patterned layer has a pattern formed with an interference pigment to produce a color by interference of light reflected after being incident on the front surface of the patterned layer. The back color-adjustment layer covers the back surface of the patterned layer and transmits light. The molded member supports the patterned layer and the back color-adjustment layer. The molded member transmits light. The back color-adjustment layer contains particles of a back absorbing pigment dispersed uniformly across the back color-adjustment layer. The back absorbing pigment has a light-absorbing property to cause light transmitted to a front of the cover panel at a predetermined position to be indicated by a point (x, y) satisfying 0.28≤x≤0.36 and 0.28≤y≤0.36 on an xy chromaticity diagram.

In the cover panel with this structure, the white light transmitted from the back surface to the front surface of the patterned layer can be colored in a color other than white by, for example, the molded member, the back color-adjustment layer, and the patterned layer. In response to this, the back absorbing pigment causes light transmitted to the front of the cover panel at the predetermined position to be indicated by a point (x, y) satisfying 0.28≤x≤0.36 and 0.28≤y≤0.36 on the xy chromaticity diagram. This reduces coloration, in a color other than white, of light transmitted through the cover panel.

A cover panel according to the above aspect or another aspect may have a light transmittance of 10 to 70% inclusive at a position at which light is transmitted from the back surface to the front surface of the patterned layer.

The cover panel with this structure prevents the internal components covered with the cover panel from being visible through the patterned layer to the viewer of the pattern.

A display device according to a first aspect of the present invention includes a patterned layer, a front color-adjustment layer, a back color-adjustment layer, a molded member, and a light source. The patterned layer transmits light from a back surface to a front surface of the patterned layer. The patterned layer has a pattern formed with an interference pigment to produce a color by interference of light reflected after being incident on the front surface of the patterned layer. The front color-adjustment layer covers the front surface of the patterned layer and transmits light. The back color-adjustment layer covers the back surface of the patterned layer and transmits light. The molded member supports the front color-adjustment layer, the patterned layer, and the back color-adjustment layer. The molded member transmits light. The light source emits light to be transmitted through the molded member, the back color-adjustment layer, the patterned layer, and the front color-adjustment layer. The front color-adjustment layer contains particles of a front absorbing pigment dispersed uniformly across the front color-adjustment layer, and the front color-adjustment layer with the front absorbing pigment reduces a spectral component in a predetermined wavelength range of light transmitted through the front color-adjustment layer. The back color-adjustment layer contains particles of a back absorbing pigment dispersed uniformly across the back color-adjustment layer. The back absorbing pigment has a light-absorbing property to cause light transmitted to a front of the display device at a predetermined position to be indicated by a point (x, y) satisfying (x1−0.03)≤x≤(x1+0.03) and (y1−0.03)≤y≤(y1+0.03) on an xy chromaticity diagram, where a point (x1, y1) indicates a color of the light source on the xy chromaticity diagram.

In the display device with this structure, the light transmitted from the back surface to the front surface of the patterned layer can be colored by, for example, the molded member, the back color-adjustment layer, the patterned layer, and the front color-adjustment layer and can have a color shifted from the color of light from the light source. In response to this, the back absorbing pigment causes light transmitted to the front of the display device at the predetermined position to be indicated by a point (x, y) satisfying (x1−0.03)≤x≤(x1+0.03) and (y1−0.03)≤y≤(y1+0.03) on the xy chromaticity diagram. This reduces the likelihood that the color of light is shifted from the light source color when the light is transmitted through, for example, the molded member, the back color-adjustment layer, the patterned layer, and the front color-adjustment layer.

A display device according to a second aspect of the present invention includes a patterned layer, a back color-adjustment layer, a molded member, and a light source. The patterned layer transmits light from a back surface to a front surface of the patterned layer. The patterned layer has a pattern formed with an interference pigment to produce a color by interference of light reflected after being incident on the front surface of the patterned layer. The back color-adjustment layer covers the back surface of the patterned layer and transmits light. The molded member supports the patterned layer and the back color-adjustment layer. The molded member transmits light. The light source emits light to be transmitted through the molded member, the back color-adjustment layer, and the patterned layer. The back color-adjustment layer contains particles of a back absorbing pigment dispersed uniformly across the back color-adjustment layer. The back absorbing pigment has a light-absorbing property to cause light transmitted through the molded member, the back color-adjustment layer, and the patterned layer at a predetermined position to be indicated by a point (x, y) satisfying (x1−0.03)≤x≤(x1+0.03) and (y1−0.03)≤y≤(y1+0.03) on an xy chromaticity diagram, where a point (x1, y1) indicates a color of the light source on the xy chromaticity diagram.

In the display device with this structure, the light transmitted from the back surface to the front surface of the patterned layer can be colored by, for example, the molded member, the back color-adjustment layer, and the patterned layer and can have a color shifted from the color of light from the light source. In response to this, the back absorbing pigment causes light transmitted to the front of the display device at the predetermined position to be indicated by a point (x, y) satisfying (x1−0.03)≤x≤(x1+0.03) and (y1−0.03)≤y≤(y1+0.03) on the xy chromaticity diagram. This reduces the likelihood that the color of light is shifted from the light source color when the light is transmitted through, for example, the molded member, the back color-adjustment layer, and the patterned layer.

A display device according to a third aspect of the present invention includes at least one of a front color-adjustment layer or a back color-adjustment layer, a patterned layer, a molded member, a display, an outer frame, and an optically clear adhesive. The patterned layer transmits light from a back surface to a front surface of the patterned layer. The patterned layer has a pattern formed with an interference pigment to produce a color by interference of light reflected after being incident on the front surface of the patterned layer. The front color-adjustment layer covers the front surface of the patterned layer and transmits light. The back color-adjustment layer covers the back surface of the patterned layer and transmits light. The molded member supports at least one of the front color-adjustment layer or the back color-adjustment layer and the patterned layer. The molded member transmits light. The display emits light to be transmitted through at least one of the front color-adjustment layer or the back color-adjustment layer, the molded member, and the patterned layer. The outer frame is located between the display and the patterned layer along an outer edge of the display to block light. The optically clear adhesive fills a space between the molded member and the display. The front color-adjustment layer contains particles of a front absorbing pigment dispersed uniformly across the front color-adjustment layer, and the front color-adjustment layer with the front absorbing pigment reduces a spectral component in a predetermined wavelength range of light transmitted through the front color-adjustment layer. The back color-adjustment layer contains particles of a back absorbing pigment dispersed uniformly across the back color-adjustment layer. The back absorbing pigment has a light-absorbing property to cause light transmitted through light-transmissive members located frontward from the optically clear adhesive to have a color closer to an achromatic color than when the light is transmitted through the light-transmissive members excluding the back color-adjustment layer.

The display device with this structure includes the optically clear adhesive between the molded member and the display with no space between them, thus avoiding the molded member facing an air gap. The display device thus includes no interface between the molded member and an air gap that can reflect light incident on the front surface of the patterned layer. This reduces the likelihood that the edge of the outer frame is visible with light reflected at an interface with an air gap when the display emits no light.

Advantageous Effects

The decorative sheet according to the above aspects of the present invention has the pattern formed with the interference pigment and is more versatile with reduced coloration specific to the interference pigment. The cover panel and the display device according to the above aspects of the present invention are decorated with the pattern formed with the interference pigment with reduced coloration specific to the interference pigment.

BRIEF DESCRIPTION OF DRAWINGS

FIG. 7 is an example table showing the thickness, the transmittance, and the transmitted color of a front color-adjustment layer, a patterned layer, and the back color-adjustment layer.

FIG. 20 is a schematic cross-sectional view of the display device according to the second embodiment, showing an example structure.

DETAILED DESCRIPTION

First Embodiment (1) Overall Structure

Figure 1A:
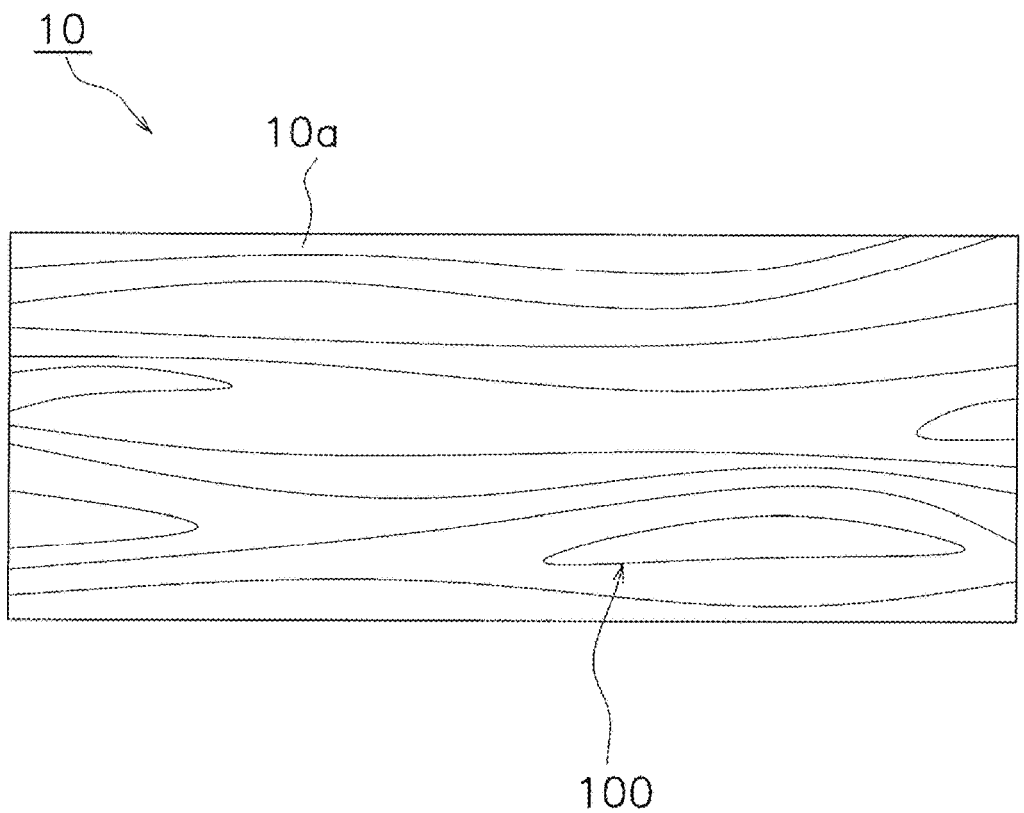
FIG. 1A is a diagram of a cover panel according to a first embodiment, showing the appearance of the cover panel with reflected light as viewed from the front.
Figure 1B:
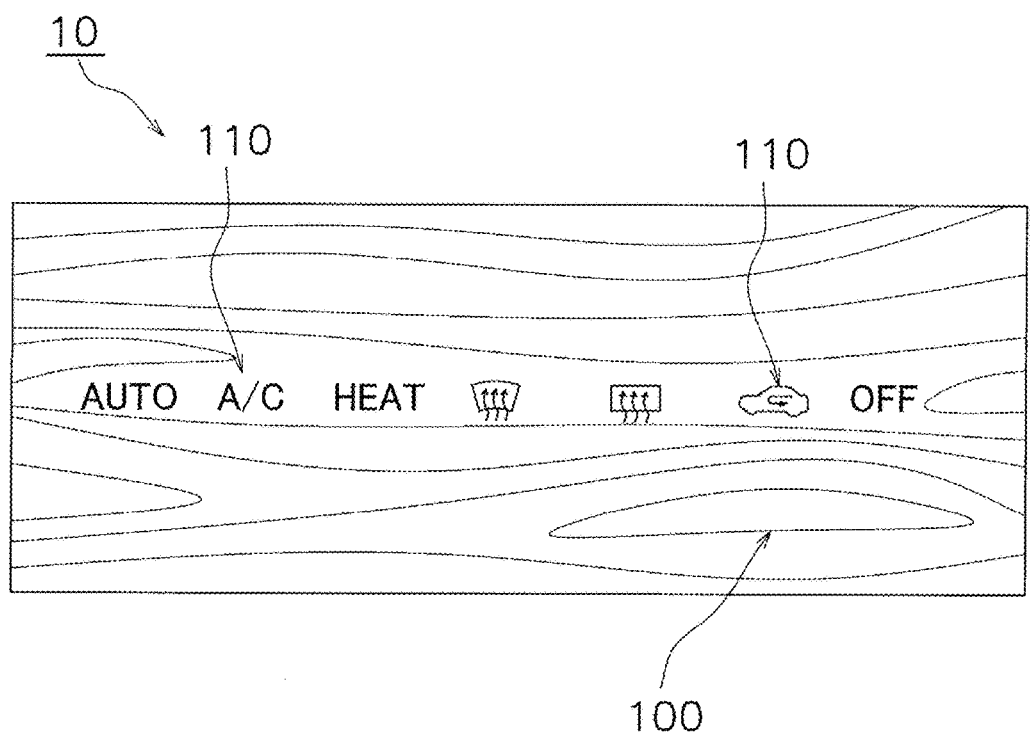
FIG. 1B is a diagram of the cover panel according to the first embodiment, showing the appearance of the cover panel with transmitted light as viewed from the front.
Figure 2:
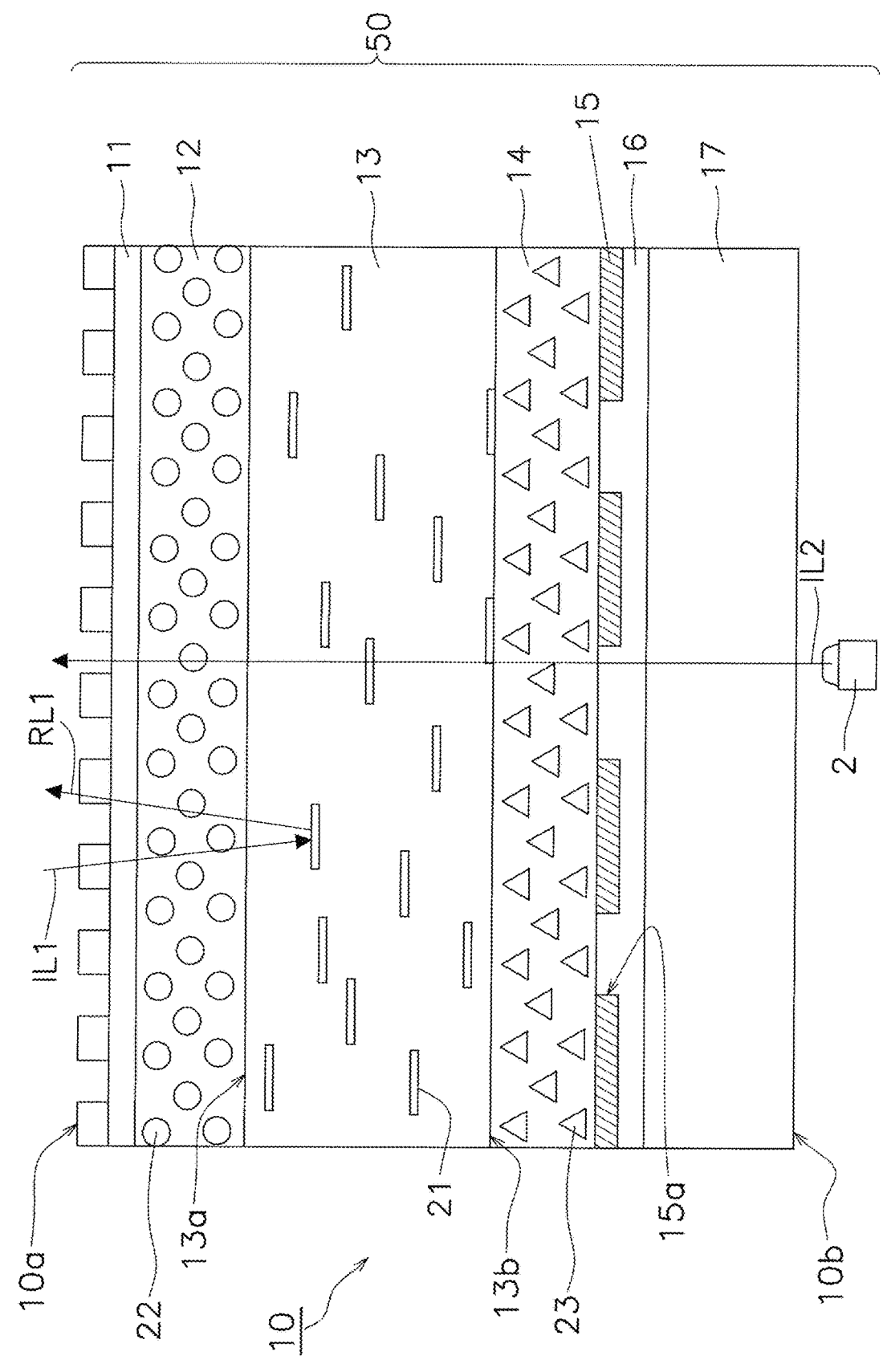
FIG. 2 is a schematic cross-sectional view of the cover panel according to the first embodiment, showing an example structure.

FIGS. 1A and 1B each show a cover panel 10 according to a first embodiment as viewed from the front. FIG. 2 schematically shows the cross section of the cover panel 10. A viewer views the cover panel 10 in the direction facing a front surface 10a of the cover panel 10. As shown in FIG. 2, a light source 2 is located adjacent to a back surface 10b of the cover panel 10. The cover panel 10 and the light source 2 are included in a display device 50.

FIG. 1A shows the appearance of the cover panel 10 with an incident light IL1 incident on the front surface 10a of the cover panel 10 with the light source 2 being off. FIG. 1B shows the appearance of the cover panel 10 with an incident light IL2 incident on the back surface 10b of the cover panel 10 with the light source 2 being on. As shown in FIG. 1A in comparison with FIG. 1B, when the light source 2 is off, a wood grain pattern 100 alone appears on the front surface 10a of the cover panel 10 to the viewer. When the light source 2 is on, icons 110 appear in the wood grain pattern 100. Although the pattern 100 is a wood grain in this example, any other pattern may be used.

The cover panel 10 includes a hard coat layer 11, a front color-adjustment layer 12, a patterned layer 13, a back color-adjustment layer 14, a shielding layer 15, an adhesive layer 16, and a molded member 17.

The hard coat layer 11, the front color-adjustment layer 12, the patterned layer 13, the back color-adjustment layer 14, the adhesive layer 16, and the molded member 17 transmit the incident light IL2 incident on the back surface 10b of the cover panel 10 to display the icons 110. In the cover panel 10 shown in FIG. 2, the icons 110 have the shapes defined by the shielding layer 15. More specifically, the shielding layer 15 has openings defining the shapes of the icons 110. For example, the icon 110 of A/C, which indicates the operating status of an air conditioner, appears through openings in the shielding layer 15 in the shapes of A, /, and C.

The wood grain pattern 100 is included in the patterned layer 13. The patterned layer 13 contains an interference pigment 21 forming the pattern 100. The interference pigment 21 produces a color by interference of reflected light RL1 reflected after being incident as the incident light IL1 on the interference pigment 21. The incident light IL1 incident on the patterned layer 13 is partly reflected and output through the front surface 10a of the cover panel 10. The reflected light RL1 appears as the wood grain pattern 100 to the viewer of the cover panel 10. The patterned layer 13 has the pattern 100 formed with the interference pigment 21 that produces a color by interference of light reflected after being incident on a front surface 13a of the patterned layer 13. The patterned layer 13, which has the pattern 100 formed with the interference pigment 21, transmits light from a back surface 13b to the front surface 13a.

The hard coat layer 11 is formed from a material that transmits the incident light IL1 and IL2 incident on the front surface 10a and the back surface 10b of the cover panel 10. The hard coat layer 11 is formed from, for example, a high hardness transparent resin. The hard coat layer 11 also transmits the reflected light RL1 from the patterned layer 13.

The front color-adjustment layer 12 covers the front surface 13a of the patterned layer 13. The front color-adjustment layer 12 transmits the incident light IL1 to be incident on the front surface 13a of the patterned layer 13, the reflected light RL1 output from the patterned layer 13, and the incident light IL2 incident on the back surface 10b of the cover panel 10. The front color-adjustment layer 12 contains particles of a front absorbing pigment 22 dispersed uniformly across the front color-adjustment layer 12. The front color-adjustment layer 12 with the front absorbing pigment 22 reduces spectral components in a predetermined wavelength range of light transmitted through the front color-adjustment layer 12. More specifically, the front absorbing pigment 22 reduces spectral components in a predetermined wavelength range of the incident light IL1 incident on the front surface 10a of the cover panel 10, the incident light IL2 incident on the back surface 10b, and the reflected light RL1 when the light IL1, IL2, and RL1 is transmitted through the front absorbing pigment 22. In other words, the front absorbing pigment 22 has light-absorbing properties to reduce spectral components in a predetermined wavelength range of light transmitted through the front color-adjustment layer 12. For a yellow front absorbing pigment 22, for example, the front absorbing pigment 22 reduces spectral components having the wavelengths in a predetermined range other than the wavelengths of the yellow spectral component.

The back color-adjustment layer 14 covers the back surface 13b of the patterned layer 13. The back color-adjustment layer 14 transmits the incident light IL1 incident on the front surface 13a of the patterned layer 13 and the incident light IL2 incident on the back surface 10b of the cover panel 10. The incident light IL1 incident on the front surface 13a of the patterned layer 13 is partly reflected by the interference pigment 21 and partly transmitted through the back color-adjustment layer 14. The back color-adjustment layer 14 contains particles of a back absorbing pigment 23 dispersed uniformly across the back color-adjustment layer 14. The back absorbing pigment 23 has light-absorbing properties to cause light transmitted through both the back color-adjustment layer 14 and the front color-adjustment layer 12 to have a color closer to an achromatic color than light transmitted through the front color-adjustment layer 12 excluding the back color-adjustment layer 14.

A color closer to an achromatic color refers to a color at a shorter distance from the white point on the CIE 1931 xy chromaticity diagram. In other words, a color closer to an achromatic color refers a color with its chromaticity and saturation closer to those of the white point on the xy chromaticity diagram, with its brightness possibly decreased. The white point is D65 on the xy chromaticity diagram. The white point is at x=0.31382 and y=0.33100 for the CIE 1964 10° standard observer, and at x=0.31271 and y=0.32902 as the chromaticity coordinates in the CIE 1931 color space.

The shielding layer 15 includes predetermined areas that transmit little or no light. The shielding layer 15 is nearer to the back surface 10b of the cover panel 10 than the patterned layer 13 and the back color-adjustment layer 14. The shielding layer 15 has openings 15a that are the areas other than the predetermined areas. The openings 15a allow passage of light. Through the openings 15a, the icons 110 appear.

The adhesive layer 16 is located on the back surface of the shielding layer 15 and transmits visible light. The adhesive layer 16 bonds the shielding layer 15 and the molded member 17. The molded member 17 is formed from a light-transmissive material. Examples of the light-transmissive material include glass and a light-transmissive resin. Examples of the light-transmissive resin include a light-transmissive thermoplastic resin and a light-transmissive thermosetting resin. The molded member 17 has been machined into an intended shape. The molded member 17 shown in each of FIGS. 1A, 1B, and 2 has the shape in conformance with the shape of the cover panel 10. For the cover panel 10 being a plate, for example, the molded member 17 is a plate. The molded member 17 supports the hard coat layer 11, the front color-adjustment layer 12, the patterned layer 13, the back color-adjustment layer 14, the shielding layer 15, and the adhesive layer 16. Although the cover panel 10 is flat in this example, the cover panel 10 may be three-dimensional. The cover panel 10 may have, for example, a cross-sectional shape including an arc.

Figure 3:
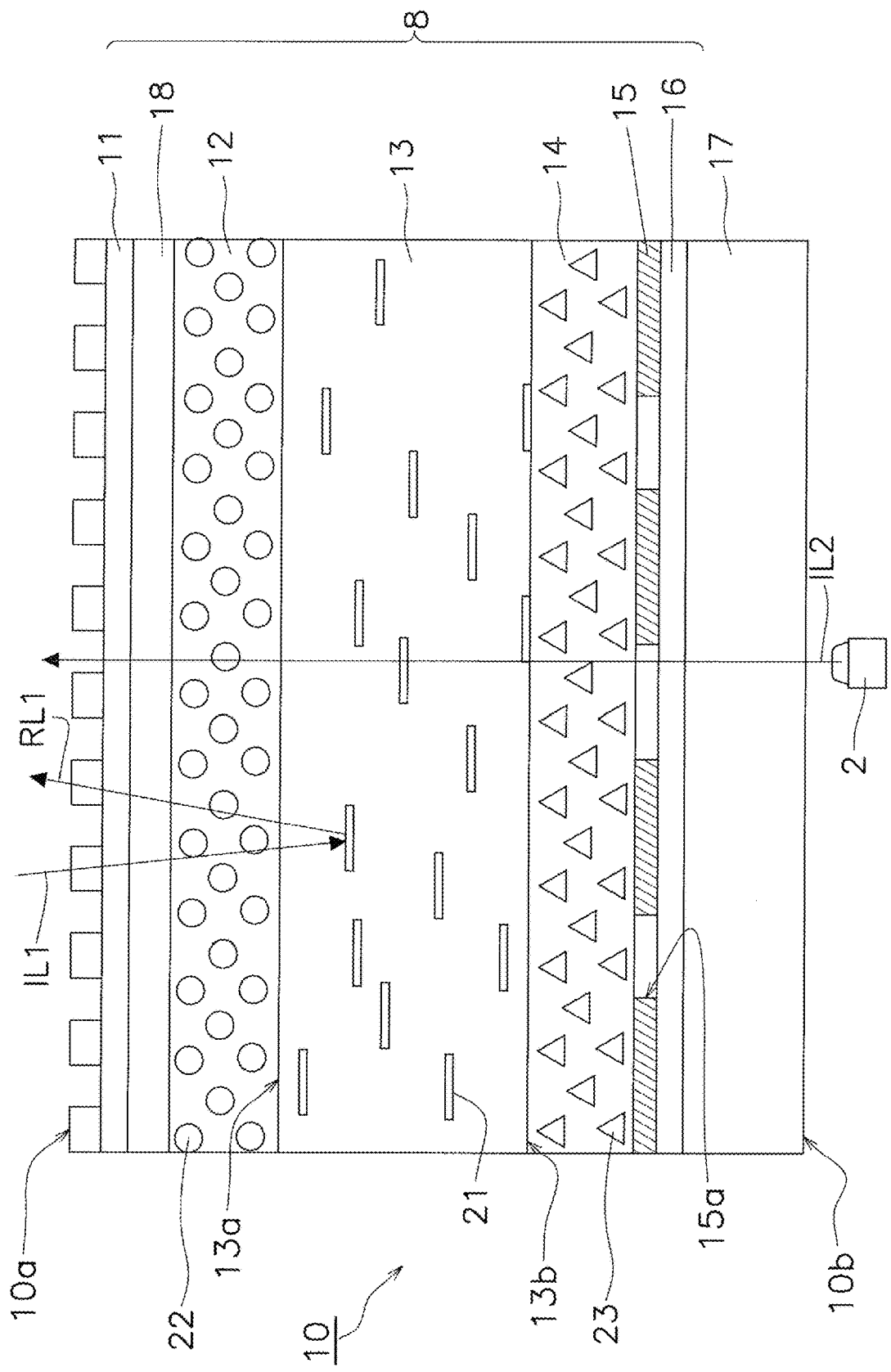
FIG. 3 is a schematic cross-sectional view of the cover panel according to the first embodiment, showing another example structure.

The cover panel 10 is manufactured by, for example, transferring the layers onto the molded member 17 simultaneously as when the molded member 17 is formed by injection molding. In some embodiments, as shown in FIG. 3, the cover panel 10 may be manufactured by bonding a decorative sheet 8 to the molded member 17 simultaneously as when the molded member 17 is formed by injection molding. In some embodiments, the molded member 17 may be formed from glass. For the molded member 17 formed from glass, the cover panel 10 is manufactured by bonding the decorative sheet 8 to the molded member 17 with an adhesive after molding the molded member 17. In some embodiments, the molded member 17 may be formed from a resin by, for example, injection molding, extrusion, blow molding, vacuum forming, pressure forming, compression molding, or machining.

The decorative sheet 8 includes the hard coat layer 11, a base film 18, the front color-adjustment layer 12, the patterned layer 13, the back color-adjustment layer 14, the shielding layer 15, and the adhesive layer 16. The base film 18 transmits visible light. Although the base film 18 is transparent in this example, the base film 18 may be translucent. The base film 18 is formed from, for example, a resin. The base film 18 is between, for example, the hard coat layer 11 and the front color-adjustment layer 12. In the decorative sheet 8, the base film 18 supports the hard coat layer 11, the front color-adjustment layer 12, the patterned layer 13, the back color-adjustment layer 14, the shielding layer 15, and the adhesive layer 16.

(2) Detailed Structure (2-1) Hard Coat Layer 11

The hard coat layer 11 is a protective layer harder than the base film 18 or the resin molded member 17. Examples of the material used for the hard coat layer 11 include an ultraviolet or ionizing radiation curable resin such as a polyester acrylate or a urethane acrylate, and a thermosetting resin such as an acrylic resin or a urethane resin. The hard coat layer may have a hardness of greater than or equal to HB in a pencil hardness test (under a load of 750 g) in accordance with the Japanese Industrial Standards (JIS) K5600-5-4.

(2-2) Patterned Layer 13

The patterned layer 13 has the pattern 100 formed with the interference pigment 21 that produces a color by interference of the reflected light RL1.

Figure 4:
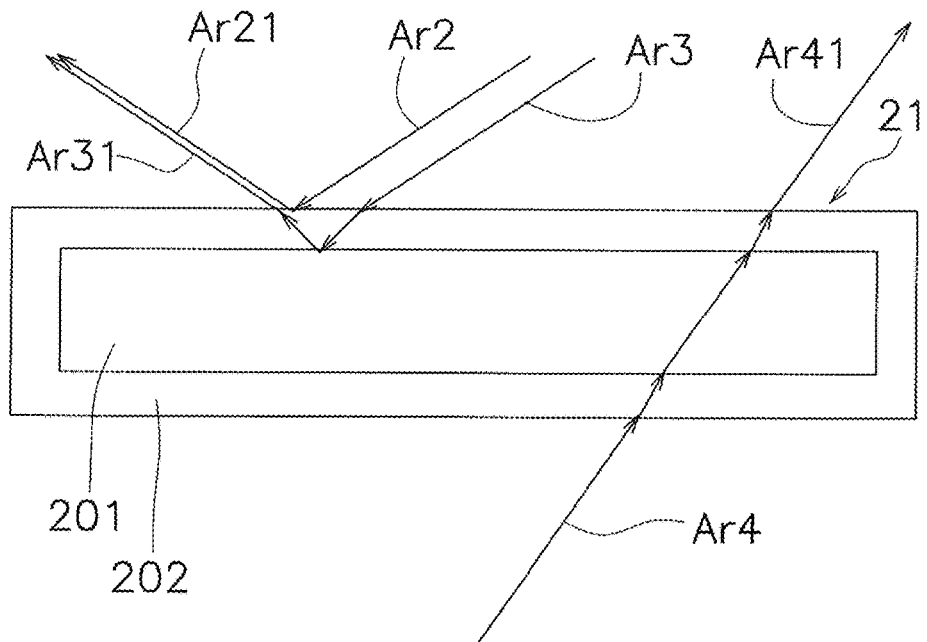
FIG. 4 is a schematic diagram of an example particle of an interference pigment forming a pattern.

FIG. 4 schematically shows an example particle of the interference pigment 21 in a cross section. A particle of the interference pigment 21 includes, for example, a core 201 and a thin shell 202 covering the core 201. The core 201 and the shell 202 both transmit visible light. The core 201 and the shell 202 are formed from materials with different refractive indexes. For example, the core 201 has a lower refractive index than the shell 202. Light incident on the shell 202 in the interference pigment 21 is indicated by arrows Ar2 and Ar3. The incident light indicated by arrow Ar3 is partly transmitted through the shell 202 and reflected by the core 201 to travel as the reflected light indicated by arrow Ar31. The incident light indicated by arrow Ar2 is partly reflected by the surface of the shell 202 to travel as the reflected light indicated by arrow Ar21. The reflected light indicated by arrow Ar21 and the reflected light indicated by arrow Ar31 interfere with and reinforce each other, and thus cause interfering light with specific wavelengths to be viewed with greater intensity. The reflected light indicated by arrow Ar21 and the reflected light indicated by arrow Ar31 correspond to, for example, the reflected light RL1 shown in FIGS. 2 and 3.

For example, the shell 202 may have the thickness adjusted to reinforce light with the wavelengths of blue by interference. In this case, the interference pigment is blue.

Visible light emitted from the light source 2 is also incident on the interference pigment 21. Such light incident on the interference pigment 21 is indicated by arrow Ar4 in FIG. 4 and corresponds to the incident light IL2. The visible light indicated by arrow Ar4 is incident on the interference pigment 21, transmitted through the interference pigment 21, and output from the interference pigment 21 at the opposite surface. The visible light transmitted through the interference pigment 21 is indicated by arrow Ar41. The transmitted light indicated by arrow Ar41 is used to display the icons 110.

The patterned layer 13 transmits the incident light IL2 incident on the back surface 10b. The cover panel 10 has a light transmittance of 10 to 50% inclusive at the position at which light is transmitted from the back surface 13b to the front surface 13a of the patterned layer 13. In the first embodiment, light is transmitted from the back surface 13b to the front surface 13a of the patterned layer 13 at the position of the icons 110. The cover panel 10 with the above transmittance at the position of the icons 110 prevents the inside of the cover panel 10 from being visible through the cover panel 10. In this example, the cover panel 10 includes small icons 110, through which the inside of the cover panel 10 is not noticeably visible. In some embodiments, however, the cover panel 10 may include a larger display area through which light is transmitted. In this case, the inside of the cover panel 10 can be more easily visible through the cover panel 10, and such a situation may be effectively avoided by appropriately setting the light transmittance of the cover panel 10 at the position at which light is transmitted from the back surface 13b to the front surface 13a of the patterned layer 13.

Figure 5:
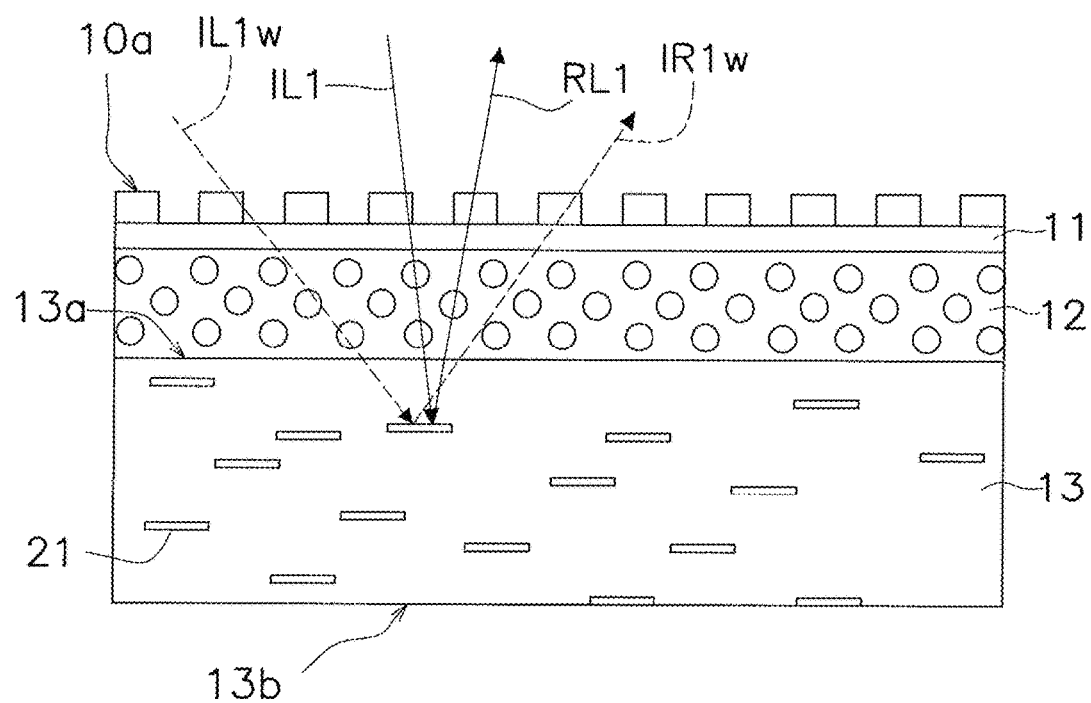
FIG. 5 is a schematic diagram describing a change in appearance of the interference pigment.

In FIG. 5, the reflection angle of the incident light IL1 incident on the interference pigment 21 and the reflected light RL1 differs from the reflection angle of incident light IL1w incident on the interference pigment 21 and reflected light RL1w. In this case, the reflected light RL1 and the reflected light RL1w travel along different paths and produce different colors of interfering light. The reflected light RL1 and the reflected light RL1w also differ in the reflective index and thus in the magnitudes of spectral components in the interfering light when the reflection angle of the incident light IL1 and the reflected light RL1 differs from the reflection angle of the incident light IL1w and the reflected light RL1w. The reflected light RL1 and the reflected light RL1w with different reflection angles also differ in the proportion of the spectral component for each frequency in the interfering light.

For example, the incident light IL1w and the reflected light RL1w have a greater reflection angle than the incident light IL1 and the reflected light RL1, and thus the reflected light RL1w has a higher intensity than the reflected light RL1. The reflected light RL1w and the reflected light RL1 also differ in the magnitude of the spectral component for each frequency in the light, and thus have different color tones.

(2-3) Front Color-Adjustment Layer 12

The front color-adjustment layer 12 contains a transparent binder resin in which particles of the front absorbing pigment 22 are dispersed uniformly. The front color-adjustment layer 12 has a thickness of, for example, 0.5 to 5 μm. The front absorbing pigment 22 in the front color-adjustment layer 12 reduces spectral components in a predetermined wavelength range of the incident light IL1 and IL1w and the reflected light RL1 and RL1w transmitted through the front color-adjustment layer 12.

The incident light IL1w and the reflected light RL1w have a greater reflection angle than the incident light IL1 and the reflected light RL1, and thus travel a longer distance through the front color-adjustment layer 12 than the incident light IL1 and the reflected light RL1. Although the interference pigment 21 reinforces the reflected light RL1w more strongly than the reflected light RL1, the front absorbing pigment 22 greatly reduces the spectral components in the predetermined wavelength range of the reflected light RL1w when the reflected light RL1w travels a longer distance through the front color-adjustment layer 12. Thus, the front absorbing pigment 22 can offset the stronger reinforcement of the reflected light RL1w than the reflected light RL1.

The wavelength range of the spectral components to be reduced by the front absorbing pigment 22 is set appropriately to reduce a difference in the color tone caused by the difference between the reflection angle of the incident light IL1 and the reflected light RL1 and the reflection angle of the incident light IL1w and the reflected light RL1w. For example, when the reflected light RL1w appears to include a lower brown spectral component than the reflected light RL1, the predetermined wavelength range for the front absorbing pigment 22 is other than the range of the brown spectral component. This reduces the likelihood that the brown interference pigment 21 appears lighter with the reflected light RL1w than with the reflected light RL1 when the reflection angle of the incident light IL1 and the reflected light RL1 differs from the reflection angle of the incident light IL1w and the reflected light RL1w. In this case, the reflected light RL1w, which travels a longer distance through the front color-adjustment layer 12 than the reflected light RL1, can greatly reduce the spectral components in the predetermined wavelength range and can easily increase the proportion of the brown spectral component outside the predetermined wavelength range. This reduces the likelihood that the brown appears lighter with the reflected light RL1w to the viewer of the cover panel 10.

(2-4) Back Color-Adjustment Layer 14

The back color-adjustment layer 14 contains a transparent binder resin in which particles of the back absorbing pigment 23 are dispersed uniformly. The back color-adjustment layer 14 has a thickness of, for example, 0.5 to 5 µm. The back absorbing pigment 23 in the back color-adjustment layer 14 reduces spectral components of the incident light IL2 transmitted through the back color-adjustment layer 14 in a wavelength range different from the wavelength range for the front absorbing pigment 22. The front color-adjustment layer 12 may have a higher light transmittance than the back color-adjustment layer 14 to allow the pattern 100 in the patterned layer 13 to be more visible.

The incident light IL2 from the light source 2 is colored by the front absorbing pigment 22. Thus, the spectral components to be reduced by the back absorbing pigment 23 are adjusted to reduce coloration of the incident light IL2 by the front absorbing pigment 22. In other words, the back absorbing pigment 23 has appropriate absorbing properties to reduce an unintended color change of the icons 110 with the front absorbing pigment 22.

(2-4-1) Causing Light to Have Color Closer to Achromatic Color

The back absorbing pigment 23 may have light-absorbing properties to cause light transmitted through both the back color-adjustment layer 14 and the front color-adjustment layer 12 to have a color closer to an achromatic color than light transmitted through the front color-adjustment layer 12 excluding the back color-adjustment layer 14.

Figure 6:
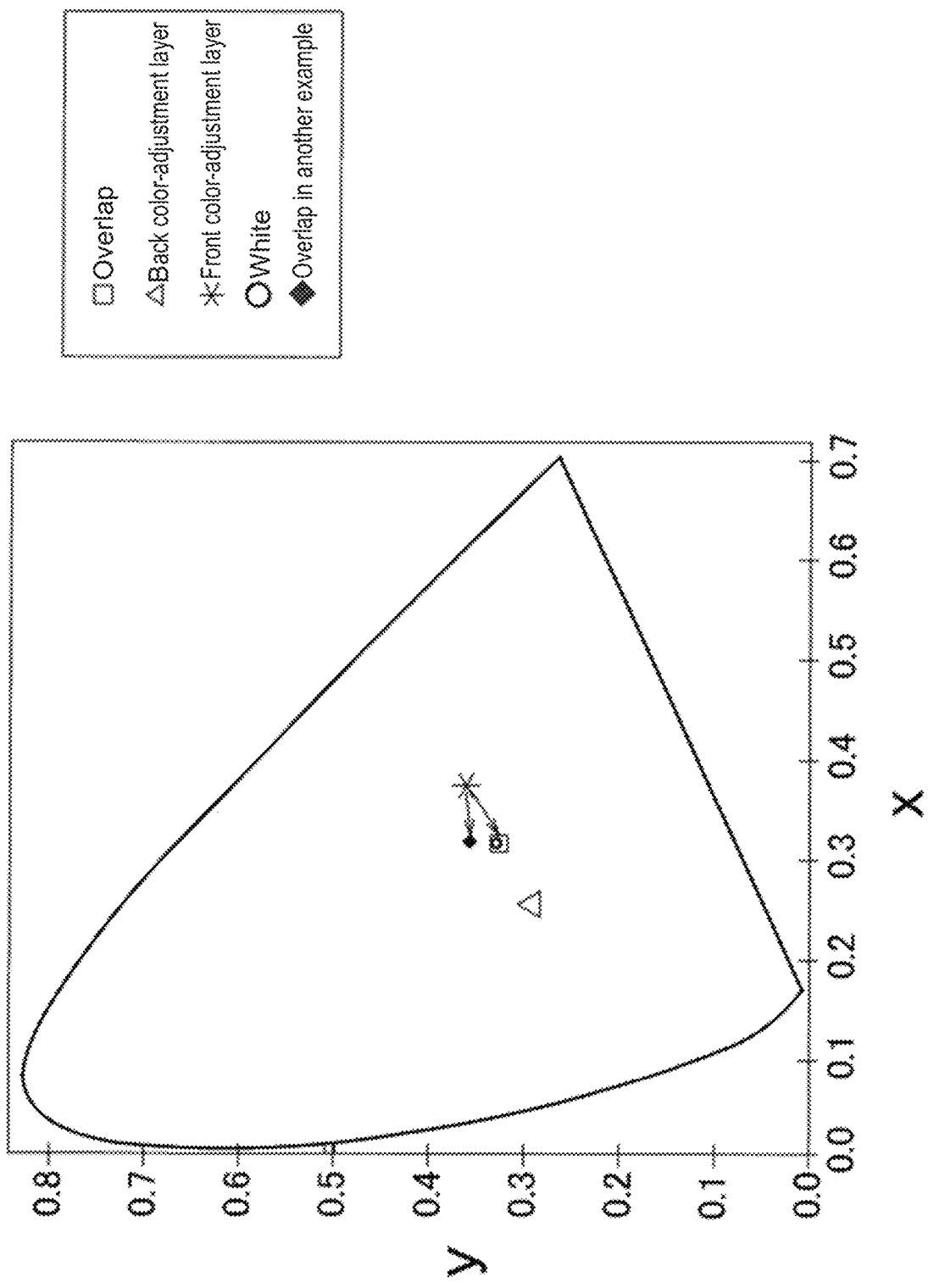
FIG. 6 is an xy chromaticity diagram showing an example adjustment of the color of transmitted light using a back color-adjustment layer.

On the CIE 1931 xy chromaticity diagram in FIG. 6, the asterisk indicates the color of light transmitted through the front color-adjustment layer 12 alone. The outlined triangle indicates the color of light transmitted through the back color-adjustment layer 14 alone. The outlined square indicates the color of light transmitted through the front color-adjustment layer 12 and the back color-adjustment layer 14. In other words, the outlined square indicates the color of the overlap between the front color-adjustment layer 12 and the back color-adjustment layer 14. The outlined circle indicates the color (white) of light transmitted through neither the front color-adjustment layer 12 nor the back color-adjustment layer 14. In this example, the color (light source color) of light emitted from the light source 2 is white. In other words, the outlined circle indicates the white point on the CIE 1931 xy chromaticity diagram.

With the front color-adjustment layer 12 alone, the color of the transmitted light is shifted to the position of the asterisk. The color of the transmitted light is thus adjusted by the back color-adjustment layer 14 to the position of the outlined square, or in other words, adjusted to be or to be closer to white indicated by the outlined circle.

The solid diamond indicates, for example, the color of light transmitted through the front color-adjustment layer 12 and the back color-adjustment layer 14 when the back absorbing pigment 23 has a color different from the color of the back absorbing pigment 23 in FIG. 6. The color of light indicated by the solid diamond is closer to the point (white point) indicated by the outlined circle than the color of light indicated by the asterisk, although farther from the white point than the color of light indicated by the outlined square. Thus, when the light transmitted through the front color-adjustment layer 12 and the back color-adjustment layer 14 has the color indicated by the solid diamond, the color is closer to an achromatic color.

The back absorbing pigment 23 may have light-absorbing properties to cause light transmitted through the back color-adjustment layer 14, the patterned layer 13, and the front color-adjustment layer 12 to have a color closer to an achromatic color than light transmitted through the patterned layer 13 and the front color-adjustment layer 12. In this case, the incident light IL2 incident on the back surface 10b of the cover panel 10 is colored by the patterned layer 13 and the front color-adjustment layer 12, but the back color-adjustment layer 14 can adjust the colored incident light IL2 to have an appropriate color.

(2-4-2) Front Color-Adjustment Layer 12 and Back Color-Adjustment Layer 14 With Complementary Colors The front color-adjustment layer 12 and the back color-adjustment layer 14 may have complementary colors. The complementary colors refer to a pair of colors directly opposite to each other on a color wheel. The front color-adjustment layer 12 and the back color-adjustment layer 14 having complementary colors produce an achromatic color, thus reducing coloration of light by the front color-adjustment layer 12. In some embodiments, the front absorbing pigment 22 and the back absorbing pigment 23 may have complementary colors. The front absorbing pigment 22 and the back absorbing pigment 23 having complementary colors produce an achromatic color, thus reducing coloration of light by the front color-adjustment layer 12.

(2-4-3) Point (x, y) on Xy Chromaticity Diagram Satisfying Predetermined Condition The back absorbing pigment 23 may have light-absorbing properties to cause light transmitted to the front of the cover panel 10 at the position of the icons 110 to be indicated by a point (x, y) satisfying $0.28 \leq x \leq 0.36$ and $0.28 \leq y \leq 0.36$ on the xy chromaticity diagram. The position of the icons 110 corresponds to a predetermined position at which the color of light is to be adjusted. The back color-adjustment layer 14 with the above structure can prevent the icons 110 from being colored in a color tone other than white by the portion from the molded member 17 to the hard coat layer 11 except the back color-adjustment layer 14. In other words, the back color-adjustment layer 14 with the above structure can adjust the color of the icons 110 to be white.

In some embodiments, the back absorbing pigment 23 has light-absorbing properties to cause light transmitted to the front of the cover panel 10 at the position of the icons 110 to be indicated by a point (x, y) satisfying $(x1-0.03) \leq x \leq (x1+0.03)$ and $(y1-0.03) \leq y \leq (y1+0.03)$ on the xy chromaticity diagram, where a point (x1, y1) indicates the color of the light source 2 on the xy chromaticity diagram. The back absorbing pigment 23 with such absorbing properties can adjust the color of the incident light IL2 to be closer to the color of the light source 2 when the incident light IL2 is transmitted from the back surface 10b to the front surface 10a of the cover panel 10.

For example, when the front color-adjustment layer 12, the patterned layer 13, and the back color-adjustment layer 14 have the parameters shown in FIG. 7, the light transmitted through the overlap between the front color-adjustment layer 12, the patterned layer 13, and the back color-adjustment layer 14 has a color (0.312, 0.329) satisfying (x1–

$0.03) \leq 0.312 \leq (x1+0.03)$ and $(y1-0.03) \leq 0.329 \leq (y1+0.03)$, where the point $(x1, y1)=(0.314, 0.331)$ indicates the color of the light source 2 on the xy chromaticity diagram. The icons 110 can appear in a color highly close to the color of the light source 2 when the front color-adjustment layer 12, the patterned layer 13, and the back color-adjustment layer 14 have the parameters shown in FIG. 7 and the light from the light source 2 is transmitted through the hard coat layer 11 and the molded member 17 with its color substantially unchanged.

Figure 8:
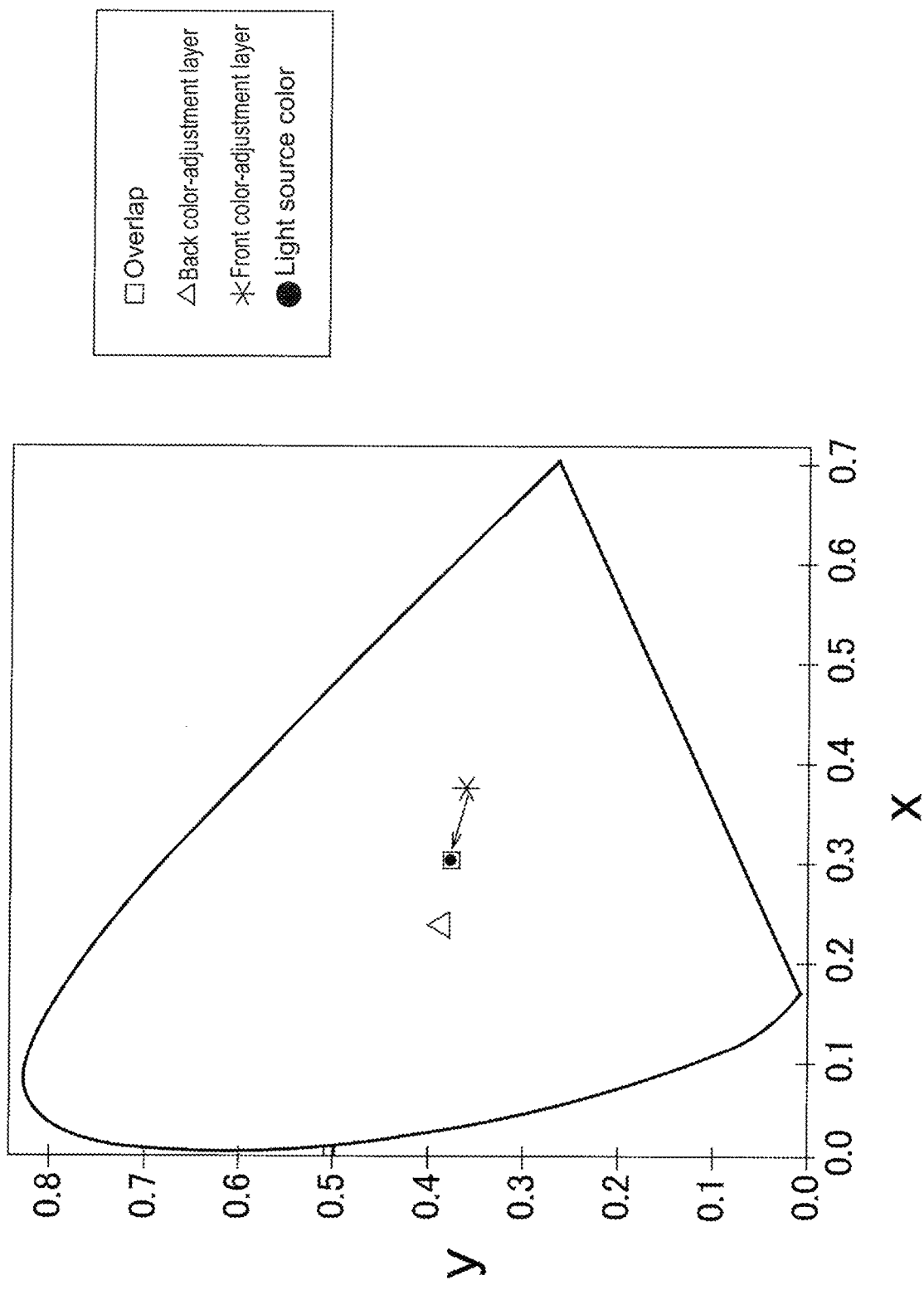
FIG. 8 is an xy chromaticity diagram showing another example adjustment of the color of transmitted light using the back color-adjustment layer.

For the light source 2 in light green, for example, the light green of the light source can be colored by the front color-adjustment layer 12 and shifted to the position of the asterisk, as shown in FIG. 8. In FIG. 8, the solid circle indicates the light source color, or specifically, the color of light emitted from the light source 2. With the front color-adjustment layer 12 alone, the color of light transmitted through the front color-adjustment layer 12 and the patterned layer 13 can be shifted to the position of the asterisk. The color can then be adjusted to the original light green by the back color-adjustment layer 14 having the color indicated by the outlined triangle.

Although the light source color in FIG. 8 is not white, the light source color may be white.

(2-5) Shielding Layer 15

The shielding layer 15 includes predetermined areas with a low light transmittance. For example, the predetermined areas in the shielding layer 15 are black and have a light transmittance close to zero. The shielding layer 15 is formed by, for example, printing with ink containing a resin in which particles of a black absorbing pigment are dispersed. For example, the ink is not applied to portions that correspond to the openings 15a, through which the icons 110 appear.

(2-6) Adhesive Layer 16

The adhesive layer 16 bonds the decorative sheet 8 to the molded member 17, or bonds a transfer layer including the hard coat layer 11, the front color-adjustment layer 12, the patterned layer 13, the back color-adjustment layer 14, and the shielding layer 15 to the molded member 17. The adhesive layer 16 transmits visible light. The adhesive layer 16 has a thickness of, for example, 1 to 50 μm. The adhesive layer 16 mainly contains, for example, an acrylic resin, a urethane resin, a polyester resin, a polyvinyl acetate resin, a vinyl chloride resin, or a vinyl chloride-vinyl acetate copolymer. The adhesive layer 16 may also contain, for example, a polymeric material as an auxiliary material to improve the adhesion.

(2-7) Base Film 18

The base film 18 has a thickness of, for example, 10 to 1,000 μm. The base film 18 is formed from, for example, a light-transmissive resin, a light-transmissive elastomer, or both. For example, the base film 18 may be a film of a polyester resin, a polyethylene terephthalate (PET) resin, an acrylic resin, a polycarbonate resin, a polybutylene terephthalate (PBT) resin, a triacetyl cellulose resin, a styrene resin, or an acrylonitrile butadiene styrene (ABS) resin, or a multilayer film of an acrylic resin and an ABS resin, or a multilayer film of an acrylic resin and a polycarbonate resin. The base film 18 may also be formed from, for example, a thermoplastic elastomer (TPE). Examples of the TPE include an amide TPE (TPA), an ester TPE (TPC), an olefin TPE (TPO), a styrene TPE (TPS), and a urethane TPE (TPU). The base film 18 may be a stack of a resin film and an elastomer film. A base film 19 may not be light-transmissive, but may be, for example, the same as the base film 18.

(3) Modifications (3-1) Modification 1A

In the above first embodiment, the decorative sheet 8 shown in FIG. 3 is used for insert molding. Instead, a decorative sheet 9 shown in FIG. 9 may be used for transferring the hard coat layer 11, the front color-adjustment layer 12, the patterned layer 13, the back color-adjustment layer 14, the shielding layer 15, and the adhesive layer 16 onto the cover panel 10 simultaneously as when the cover panel 10 shown in FIGS. 1A and 1B is formed by injection molding. The decorative sheet 9 includes, in its transfer layer, the hard coat layer 11, the front color-adjustment layer 12, the patterned layer 13, the back color-adjustment layer 14, the shielding layer 15, and the adhesive layer 16. The decorative sheet 9 includes the base film 19 adjacent to the hard coat layer 11. The base film 19 in the decorative sheet 9 is to be released from the cover panel 10 and thus does not remain on the cover panel 10 in use. Thus, the base film 19 in the decorative sheet 9 may not be light-transmissive. Although not shown in FIG. 9, a release layer may be located between the hard coat layer 11 and the base film 19.

(3-2) Modification 1B

Figure 10:
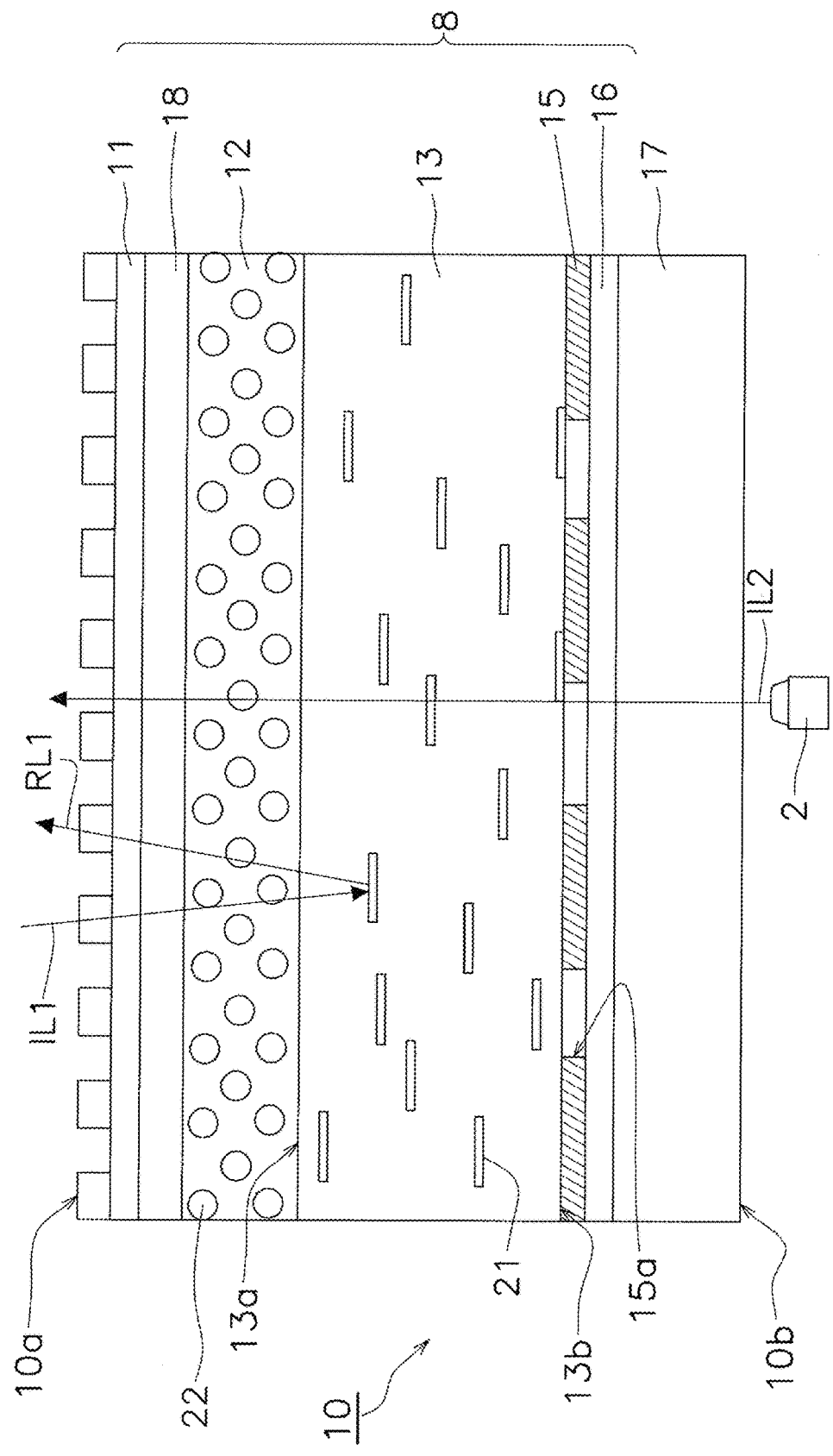
FIG. 10 is a schematic cross-sectional view of a cover panel according to modification 1B, showing an example structure.

In the above first embodiment, the back color-adjustment layer 14 is located on the patterned layer 13 adjacent to the back surface 10b. However, as shown in FIG. 10, the decorative sheet 8 and the cover panel 10 may eliminate the back color-adjustment layer 14. This structure does not have the effects of the back color-adjustment layer 14, but has the effects of the front color-adjustment layer 12 as in the first embodiment.

The cover panel 10 without the back color-adjustment layer 14 may be manufactured by known in-mold decoration using, for example, the decorative sheet 9 excluding the back color-adjustment layer 14. In this case, the cover panel 10 is manufactured by transferring a transfer layer including the hard coat layer 11, the front color-adjustment layer 12, the patterned layer 13, the shielding layer 15, and the adhesive layer 16 onto the molded member 17.

(3-3) Modification 1C

Figure 11:
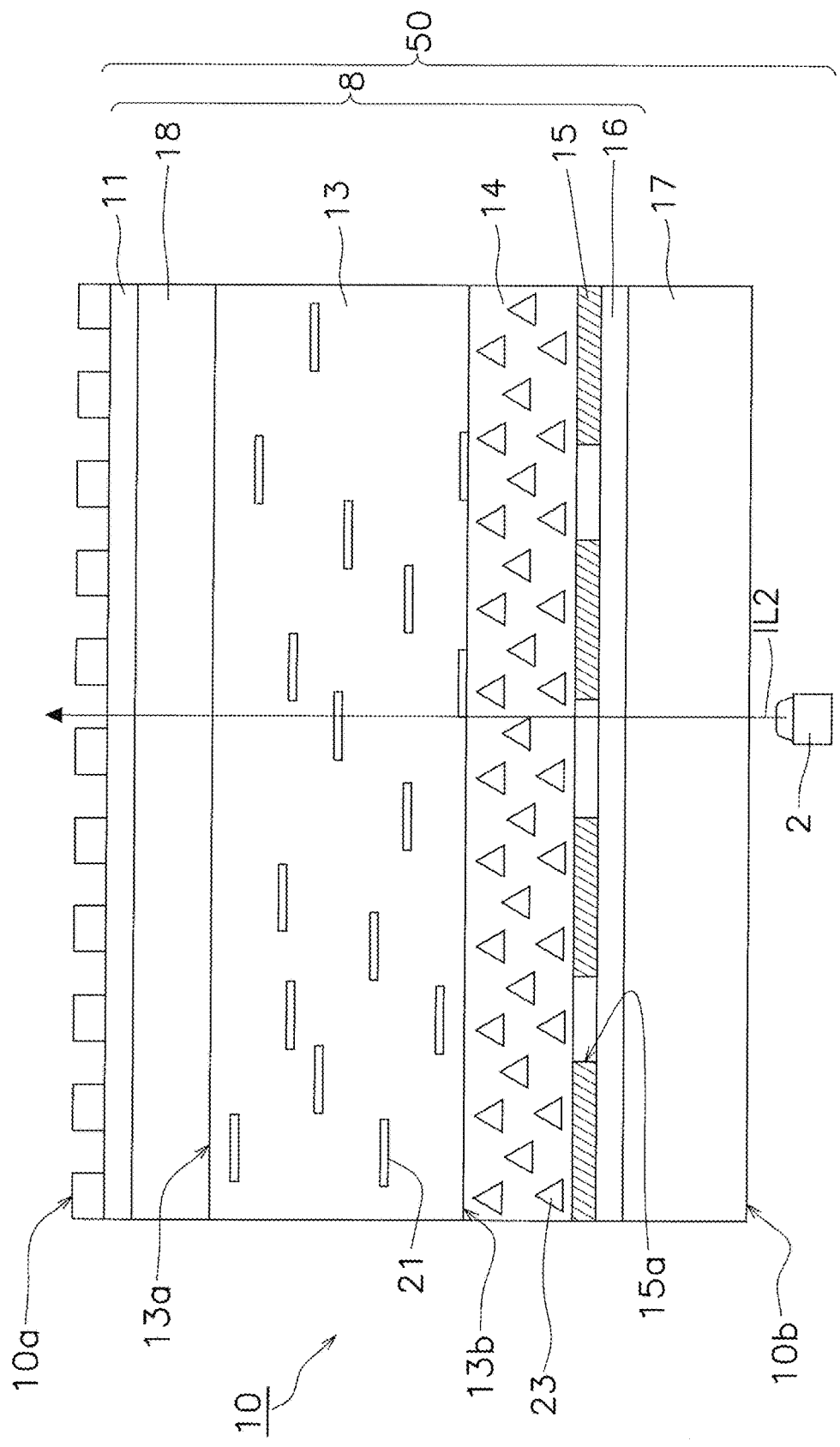
FIG. 11 is a schematic cross-sectional view of a cover panel according to modification 1C, showing an example structure.

In the above first embodiment, the front color-adjustment layer 12 is located on the patterned layer 13 adjacent to the front surface 10a. However, as shown in FIG. 11, the decorative sheet 8 and the cover panel 10 may eliminate the front color-adjustment layer 12. This structure does not have the effects of the front color-adjustment layer 12, but can adjust the color of the incident light IL2 incident on the back surface 10b of the cover panel 10 using the back color-adjustment layer 14. In this case, the back absorbing pigment 23 has light-absorbing properties to cause light transmitted to the front of the cover panel 10 at the position of the icons 110 to be indicated by a point $(x, y)$ satisfying $0.28 \leq x \leq 0.36$ and $0.28 \leq y \leq 0.36$ on the xy chromaticity diagram. The back absorbing pigment 23 with such absorbing properties can adjust the color of the incident light IL2 to be white when the incident light IL2 is transmitted from the back surface 10b to the front surface 10a of the cover panel 10. In the above example, the display position of the icons 110 is used as the predetermined position. However, any other position may be used as the predetermined position. In some embodiments, the back absorbing pigment 23 has light-absorbing properties to cause light transmitted to the front of the decorative sheet 8 at the display position of the icons 110 to be indicated by a point $(x, y)$ satisfying $0.28 \leq x \leq 0.36$ and $0.28 \leq y \leq 0.36$ on the xy chromaticity diagram. The back absorbing pigment 23 with such absorbing properties can adjust the color of the incident light IL2 to be white when the incident light IL2 is transmitted through the decorative sheet 8.

In some embodiments, the back absorbing pigment 23 has light-absorbing properties to cause light transmitted to the front of the cover panel 10 at the position of the icons 110 to be indicated by a point (x, y) satisfying (x1−0.03)≤x≤ (x1+0.03) and (y1−0.03)≤y≤(y1+0.03) on the xy chromaticity diagram, where a point (x1, y1) indicates the color of the light source 2 on the xy chromaticity diagram. The back absorbing pigment 23 with such absorbing properties can adjust the color of the incident light IL2 to be closer to the color of the light source 2 when the incident light IL2 is transmitted from the back surface 10b to the front surface 10a of the cover panel 10.

In some embodiments, the back absorbing pigment 23 has light-absorbing properties to cause light transmitted to the front of the decorative sheet 8 at the position of the icons 110 to be indicated by a point (x, y) satisfying (x1−0.03)≤x≤ (x1+0.03) and (y1−0.03)≤y≤(y1+0.03) on the xy chromaticity diagram, where a point (x1, y1) indicates the color of the light source 2 on the xy chromaticity diagram. The back absorbing pigment 23 with such absorbing properties can adjust the color of the incident light IL2 to be closer to the color of the light source 2 when the incident light IL2 is transmitted through the decorative sheet 8 from its back.

For the decorative sheet 9 that is transferred onto the cover panel 10 or for the resulting cover panel 10, the back absorbing pigment 23 with the adjusted light-absorbing properties may also be used. This can adjust the color of the icons 110 to be white or closer to the light source color.

(3-4) Modification 1D

Figure 12:
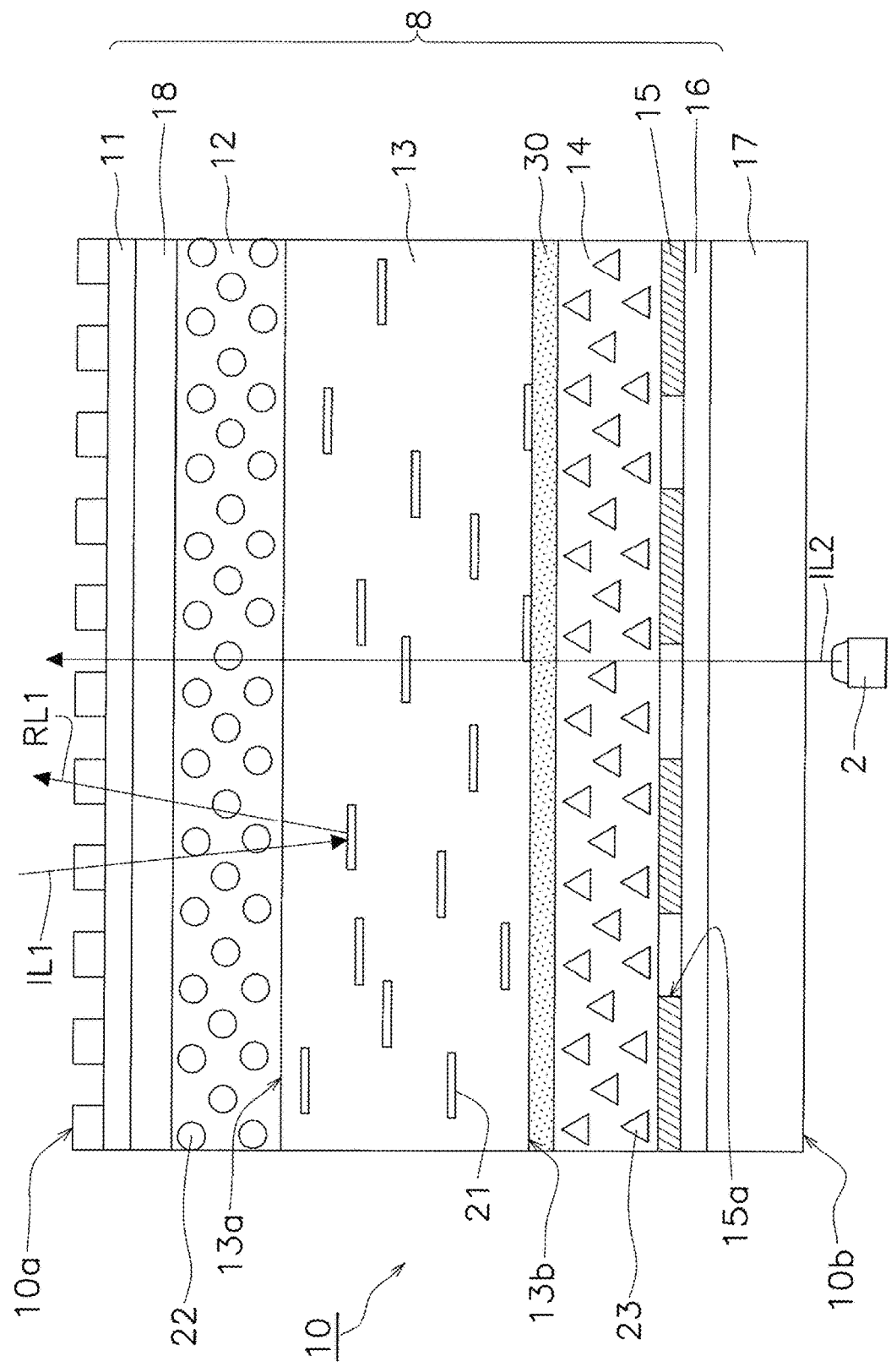
FIG. 12 is a schematic cross-sectional view of a cover panel according to modification 1D, showing an example structure.

The cover panel 10 and the decorative sheet 8 shown in FIG. 3 may further include a metallic layer 30 shown in FIG. 12 on the back surface 13b of the patterned layer 13. Similarly, the cover panel 10 shown in FIGS. 1A and 1B and the decorative sheet 9 shown in FIG. 9 may further include a metallic layer on the back surface 13b of the patterned layer 13. The metallic layer 30 reflects a relatively large amount of the incident light IL1 incident on the front surface 13a of the patterned layer 13, and partly transmits the incident light IL2 incident on the back surface 10b of the cover panel 10. The metallic layer 30 has a thickness of, for example, 0.5 to 5 μm. The metallic layer 30 contains an absorbing pigment that absorbs less light than the front absorbing pigment 22 and the back absorbing pigment 23. The metallic layer 30 is formed by, for example, printing with ink containing a transparent binder resin in which metallic powder is dispersed uniformly. The cover panel 10 with the metallic layer 30 allows more light to be reflected to the front surface 10a than without the metallic layer 30, thus allowing the pattern 100 in the patterned layer 13 to appear brighter. In other words, the metallic layer 30 can increase the brightness of the pattern 100.

With the metallic layer 30, the back color-adjustment layer 14 may adjust the color of the incident light IL2 transmitted through the layers including the metallic layer 30 (the color of the icons 110 in this example).

(3-5) Modification 1E

Figure 13:
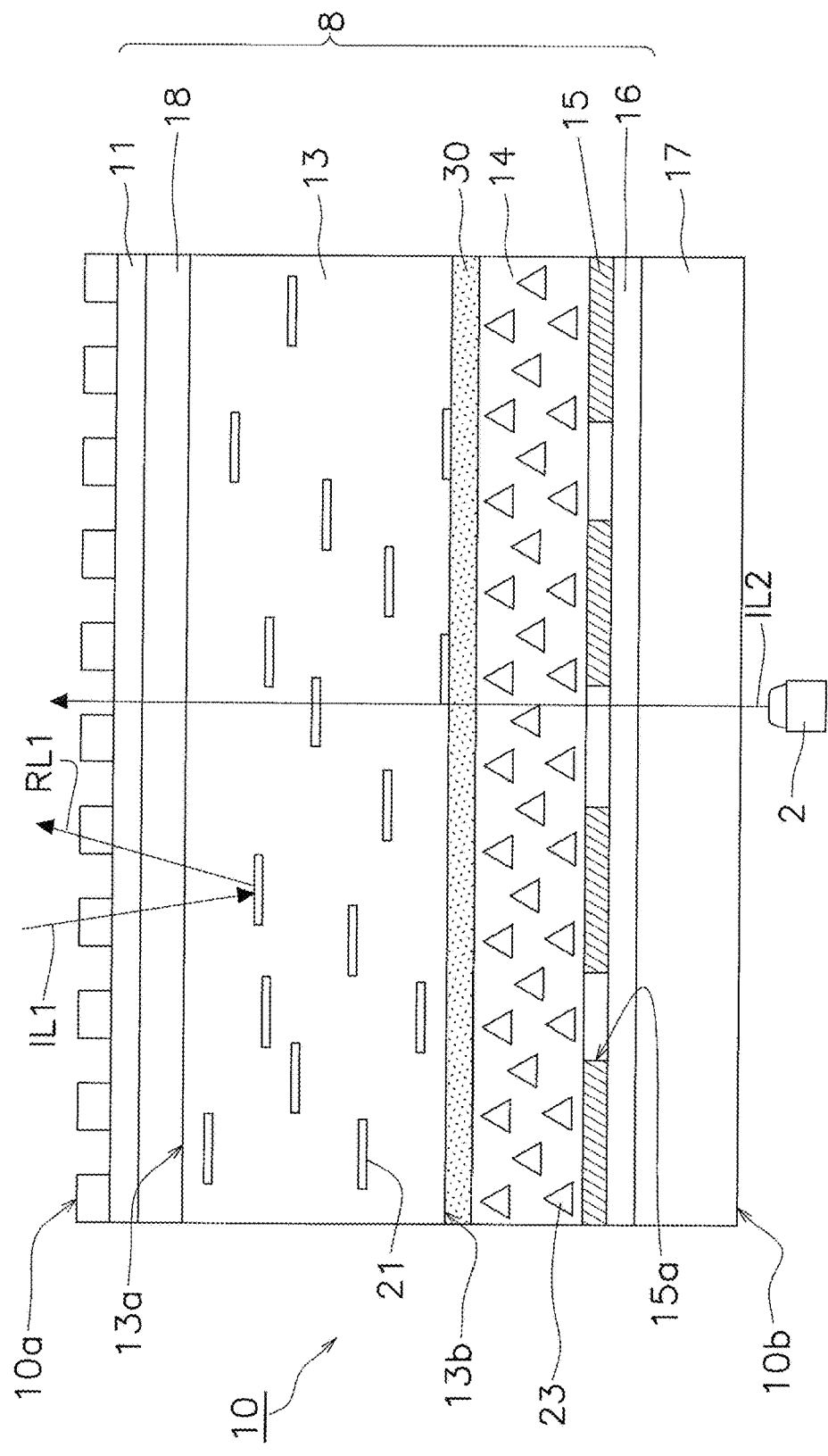
FIG. 13 is a schematic cross-sectional view of a cover panel according to modification 1E, showing an example structure.

In modification 1D, the metallic layer 30 is added to the decorative sheet 8 or 9 or the cover panel 10 shown in FIGS. 1A and 1B or FIG. 3. As shown in FIG. 13, the metallic layer 30 may also be added to the decorative sheet 8 and the cover panel 10 shown in FIG. 11 without the front color-adjustment layer 12. The metallic layer 30 may be added to the decorative sheet 9 or the cover panel 10 shown in FIGS. 1A and 1B eliminating the front color-adjustment layer 12. The decorative sheet and the cover panel with such structures can also increase the brightness of the pattern 100, similarly to the structure in modification 1D.

With the metallic layer 30, the back color-adjustment layer 14 may adjust the color of the incident light IL2 transmitted through the layers including the metallic layer 30 (the color of the icons 110 in this example).

(3-6) Modification 1F

Figure 14:
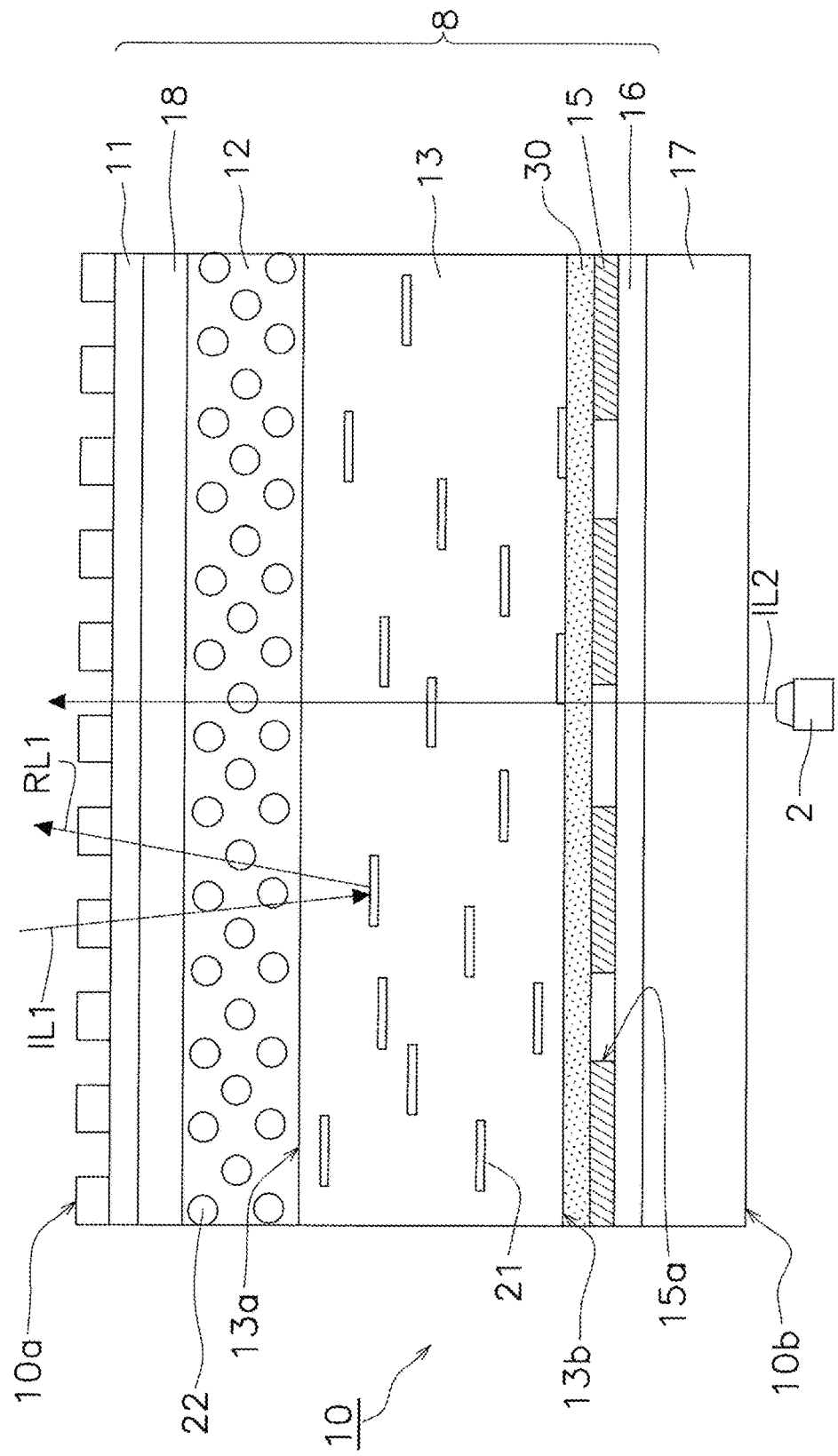
FIG. 14 is a schematic cross-sectional view of a cover panel according to modification 1F, showing an example structure.

In modification 1D, the metallic layer 30 is added to the decorative sheet 8 or 9 or the cover panel 10 shown in FIGS. 1A and 1B or FIG. 3. As shown in FIG. 14, the metallic layer 30 may also be added to the decorative sheet 8 and the cover panel 10 shown in FIG. 10 without the back color-adjustment layer 14. The metallic layer 30 may be added to the decorative sheet 9 or the cover panel 10 shown in FIGS. 1A and 1B eliminating the back color-adjustment layer 14. The decorative sheet and the cover panel with such structures can also increase the brightness of the pattern 100, similarly to the structure in modification 1D.

(3-7) Modification 1G

Figure 15:
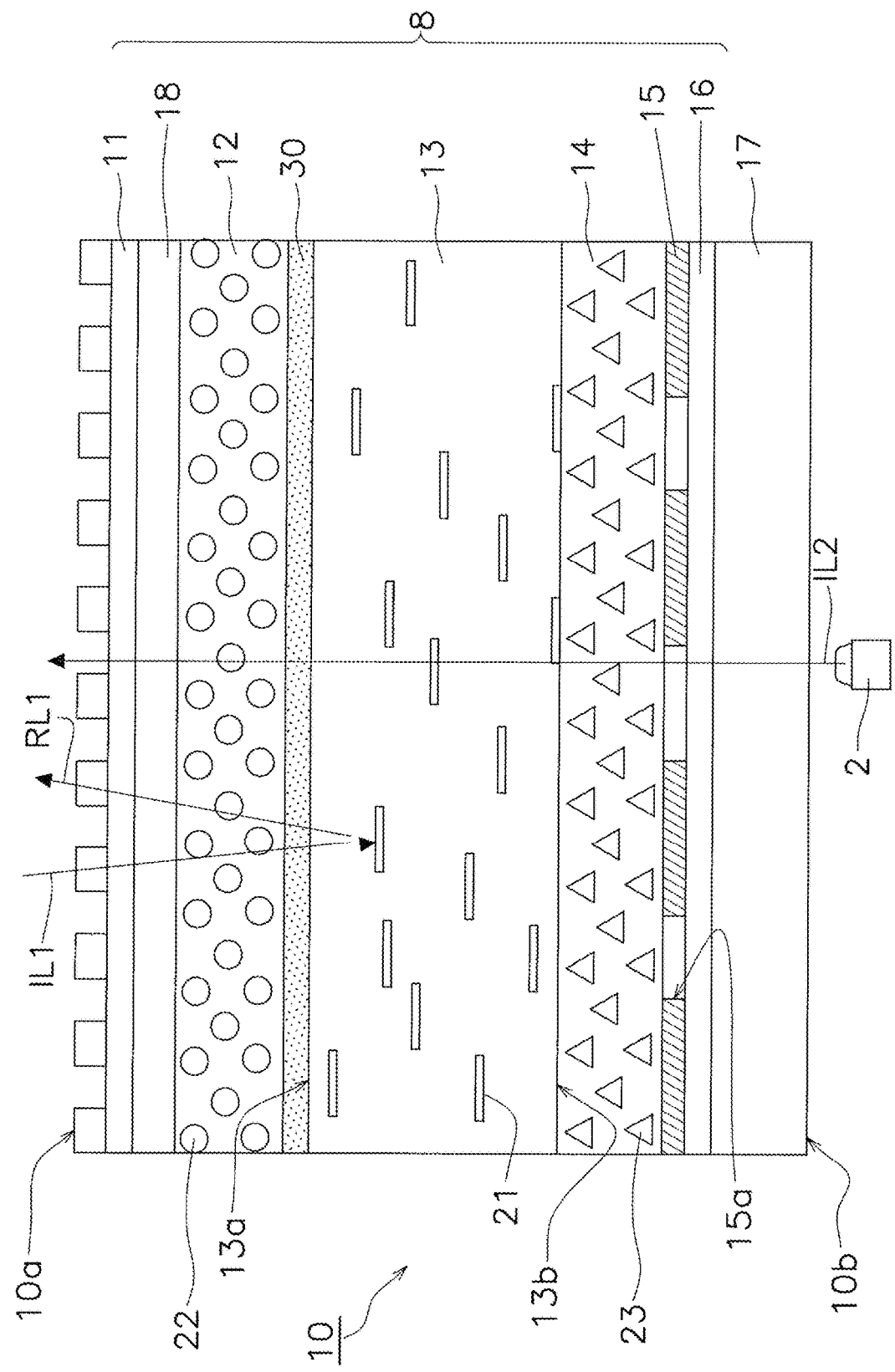
FIG. 15 is a schematic cross-sectional view of a cover panel according to modification 1G, showing an example structure.
Figure 16:
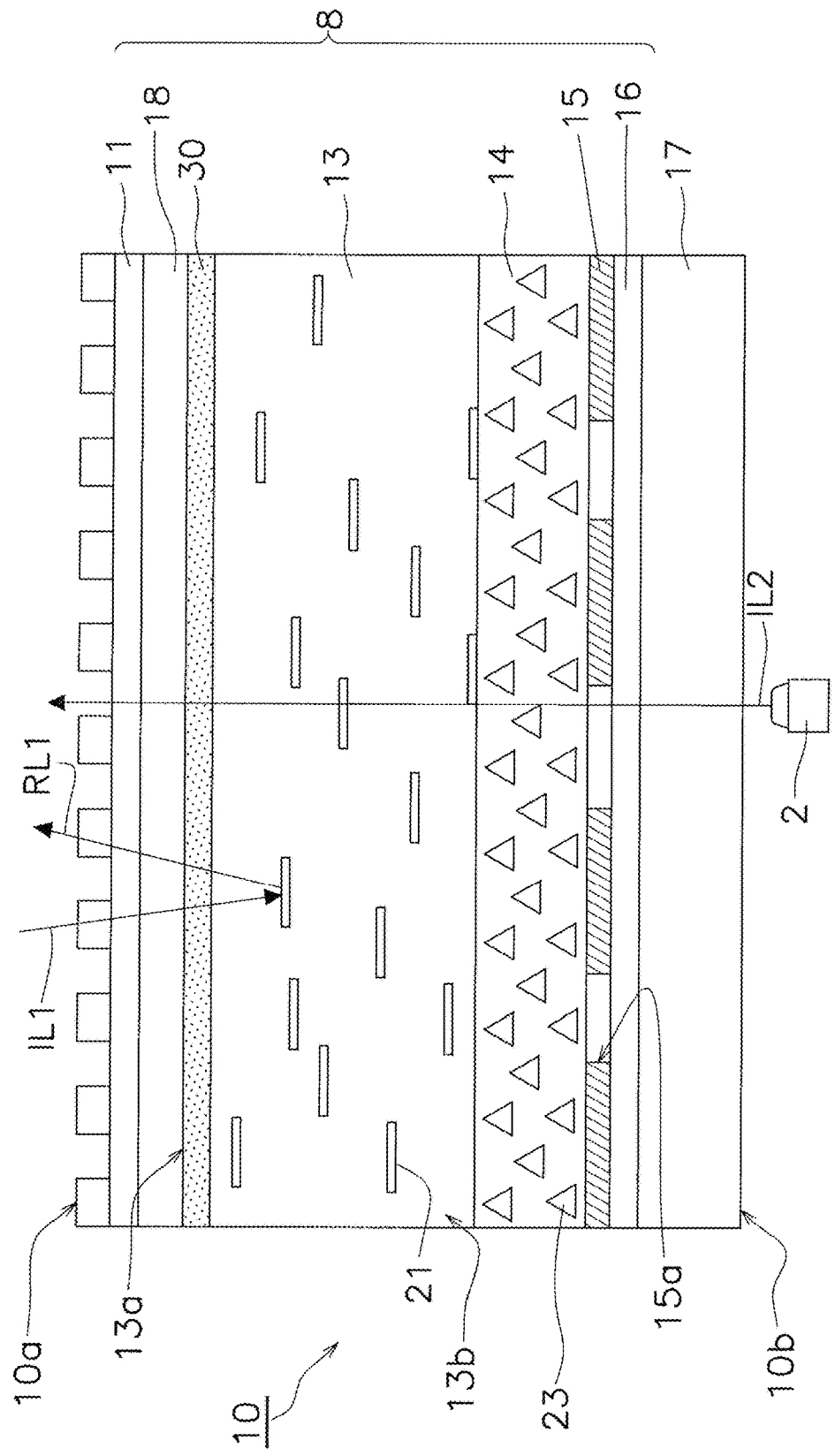
FIG. 16 is a schematic cross-sectional view of the cover panel according to modification 1G, showing another example structure.
Figure 17:
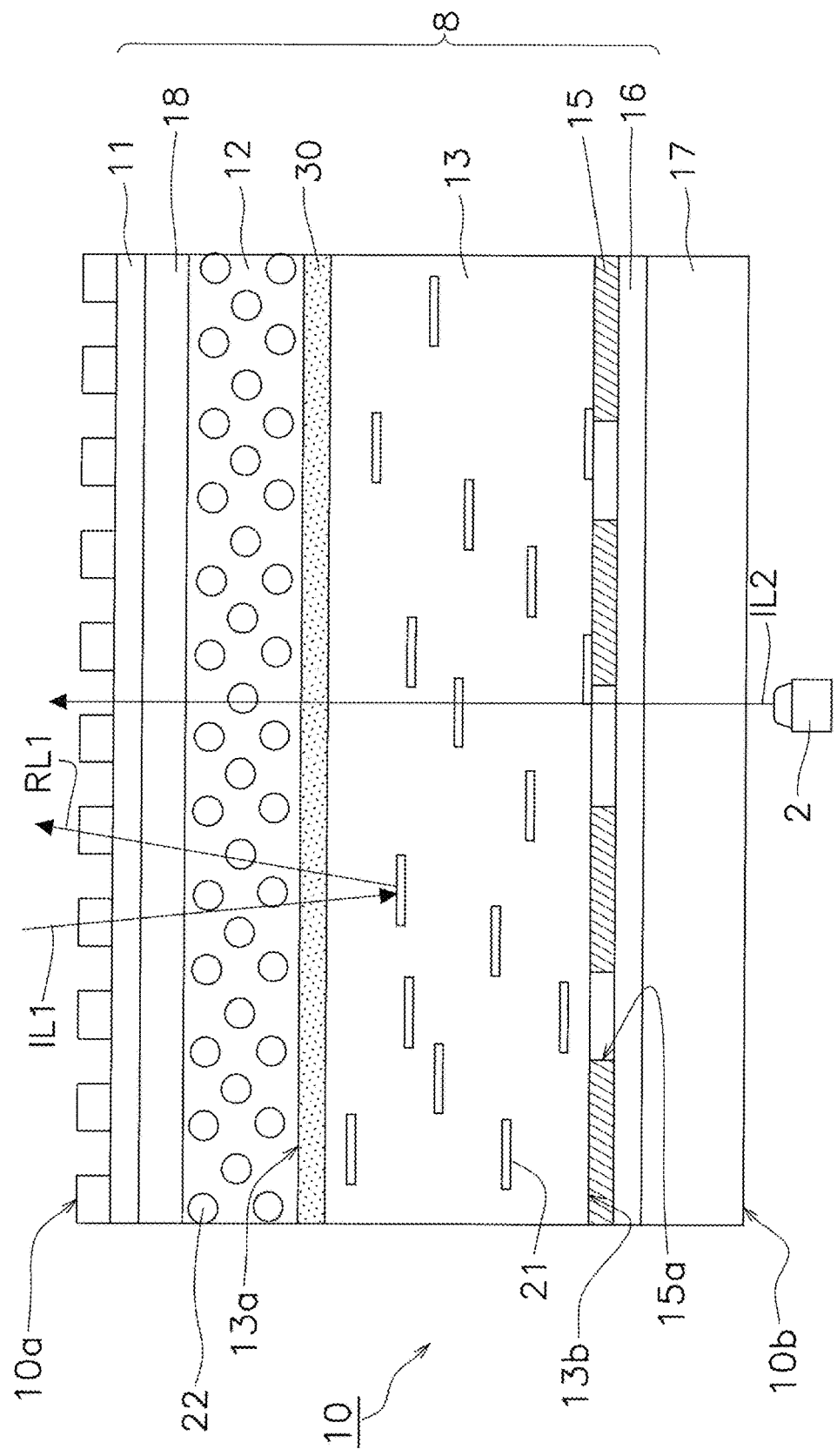
FIG. 17 is a schematic cross-sectional view of the cover panel according to modification 1G, showing another example structure.

In modification 1D, modification 1E, and modification 1F, the metallic layer 30 is located on the back surface 13b of the patterned layer 13. As shown in FIGS. 15, 16 and 17, the metallic layer 30 may be located on the front surface 13a of the patterned layer 13. With the metallic layer 30 located on the front surface 13a of the patterned layer 13, the pattern 100 appears with a metallic texture.

(3-8) Modification 1H

In the above embodiments, the decorative sheet 8 or 9 includes the shielding layer 15 to display the icons 110. However, a decorative sheet in one or more embodiments of the present invention may not include the shielding layer 15. For a display device including a display screen such as a monitor, for example, the decorative sheet and the cover panel may eliminate the shielding layer.

Second Embodiment (4) Overall Structure

In the above first embodiment, the present invention is mainly embodied in the cover panel 10.

Figure 18:
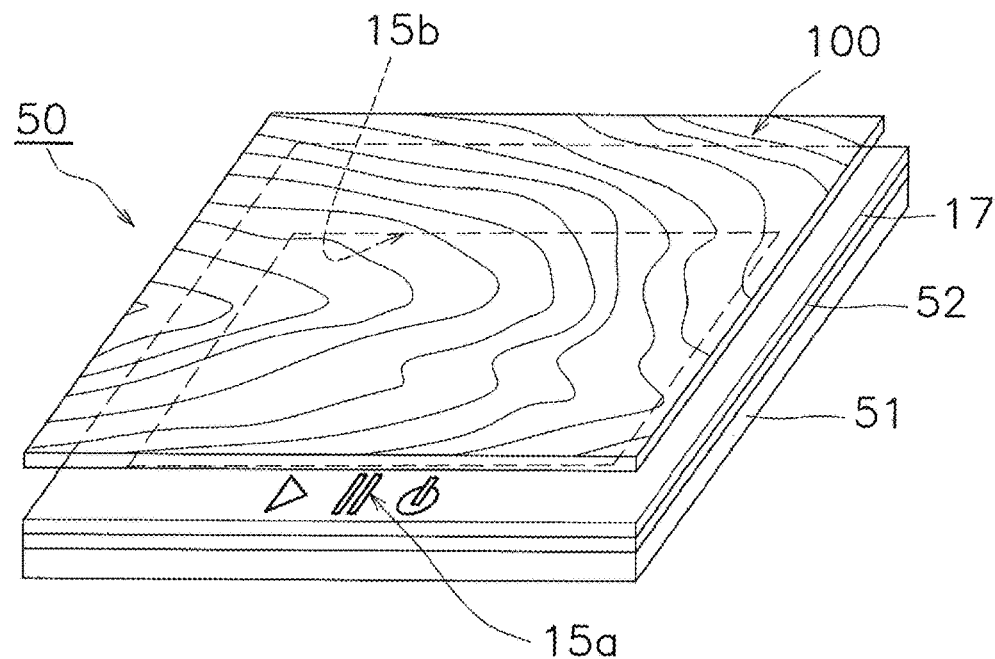
FIG. 18 is a perspective view of a display device according to a second embodiment, showing the appearance of the display device with reflected light.
Figure 19:
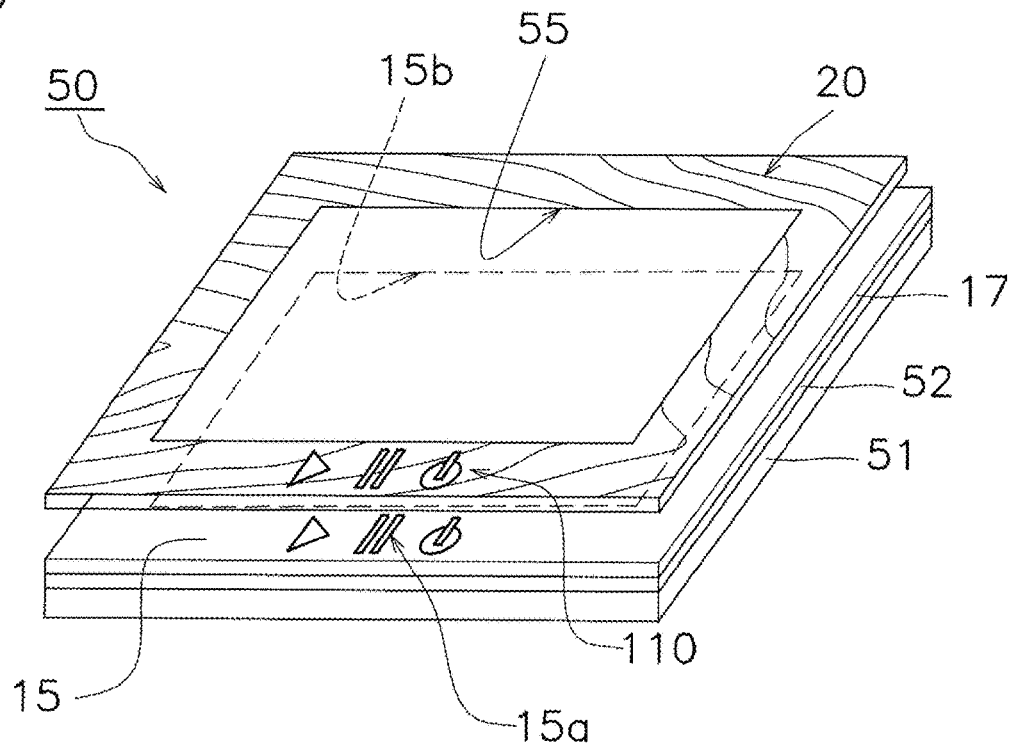
FIG. 19 is a perspective view of the display device according to the second embodiment, showing the appearance of the display device with transmitted light.

In the second embodiment, the present invention is embodied in the display device 50 shown in FIGS. 18, 19, and 20.

The display device 50 includes a display screen 55 in addition to the icons 110. For ease of explanation, FIGS. 18 and 19 show the display device 50 separated at the interface between the shielding layer 15 and the back color-adjustment layer 14.

The display device 50 includes the hard coat layer 11, the front color-adjustment layer 12, the patterned layer 13, the back color-adjustment layer 14, the shielding layer 15, the adhesive layer 16, the molded member 17, an optically clear adhesive 52, and a display 51. The display 51 emits light to display images. The hard coat layer 11, the front color-adjustment layer 12, the patterned layer 13, the back color-adjustment layer 14, the shielding layer 15, the adhesive layer 16, and the molded member 17 may have the same or similar structures as in the cover panel 10 according to the first embodiment, and thus are not described. However, the shielding layer 15 has an opening 15b in the center for displaying the display screen 55, in addition to having the openings 15a for displaying the icons 110. The molded member 17 is, for example, a transparent resin plate or a transparent glass plate. For the molded member 17 being a glass plate, the hard coat layer 11, the front color-adjustment layer 12, the patterned layer 13, the back color-adjustment layer 14, the shielding layer 15, and the adhesive layer 16 are formed by, for example, printing. In the display device 50, the shielding layer 15 is located along the outer edge of the display 51 and serves as an outer frame for blocking light. Although the shielding layer 15 is used as the outer frame in this example, another component may be used as the outer frame. For example, a thin light-shielding resin plate may be used as the outer frame.

When the display 51 in the display device 50 is off, the display device 50 displays the wood grain pattern 100 on its front. When the display 51 is off, the display screen 55 or the icons 110 do not appear with no light emission from the display 51, as shown in FIG. 18. When the display 51 in the display device 50 is on, the display screen 55 and the icons 110 appear.

The space between the molded member 17 and the display 51 is filled with the optically clear adhesive 52. The molded member 17 and the display 51 thus have no air gap between them. With an air gap created between the molded member 17 and the display 51, a reflection can occur at the boundary between the molded member 17 and the air gap that largely differ in the refractive index. Any reflection at the boundary between the molded member 17 and an air gap can cause the outline of the display screen 55 to be visible with the reflected light, thus degrading the pattern 100 in the display device 50. Thus, the optically clear adhesive 52 is placed between the molded member 17 and the display 51 to eliminate an air gap facing the molded member 17. The optically clear adhesive 52 thus fills the space between the molded member 17 and the display 51 to reduce a difference in the appearance between the area with the display screen 55 and the outer frame area without the display screen 55 (the area of the shielding layer 15 that blocks light).

The optically clear adhesive is a highly transparent adhesive or a highly transparent bonding agent and may include, for example, an optically clear resin (OCR).

Similarly to the structures in the first embodiment and modifications 1A to 1G, the display device 50 according to the second embodiment may include the front color-adjustment layer 12 or the back color-adjustment layer 14 to adjust the color of light produced when the reflected light RL1 and RL2 and the incident light IL2 are transmitted to the front of the display device 50. The display device 50 may also include the metallic layer 30.

(5) Features (5-1)

Figure 9:
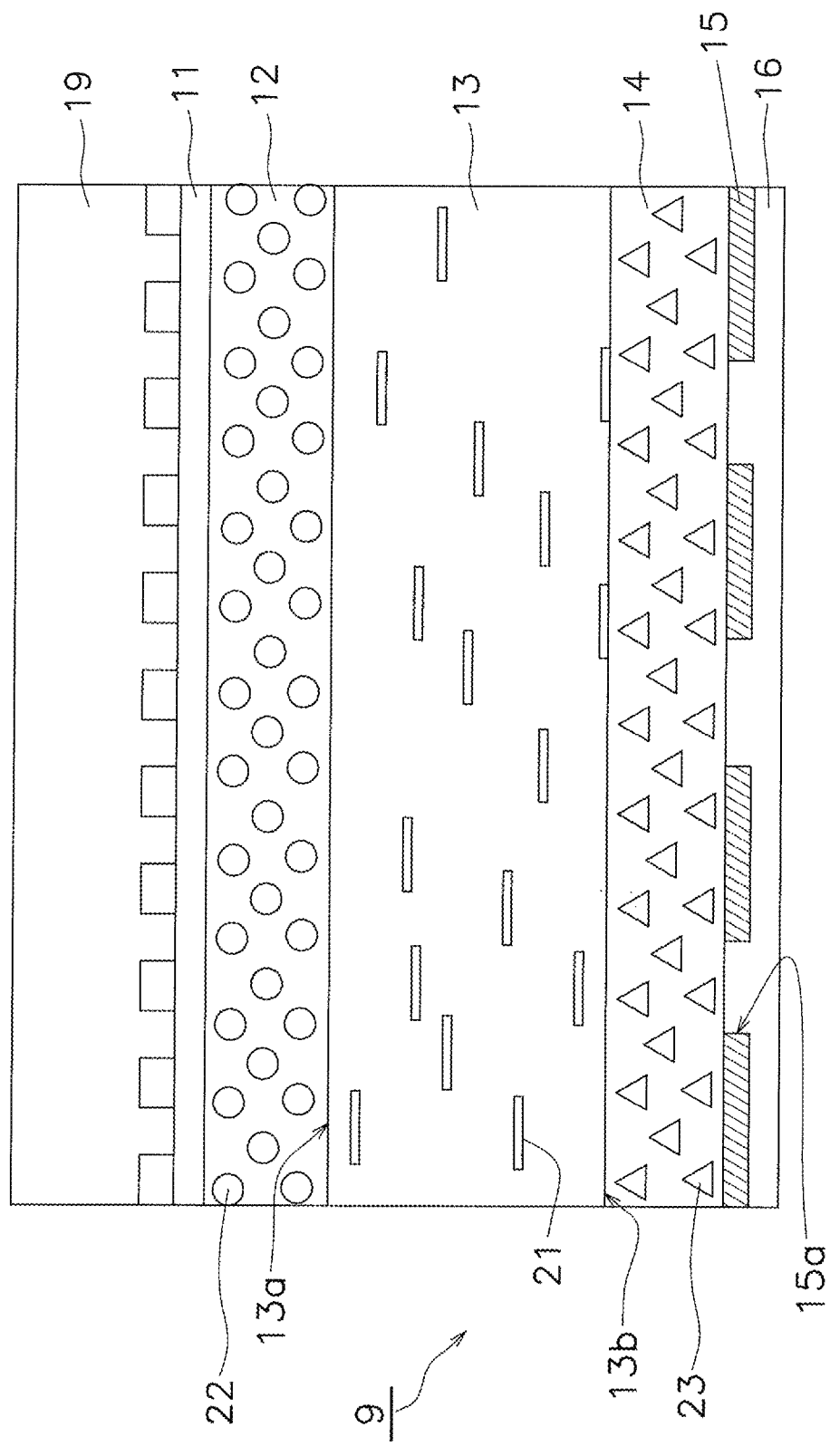
FIG. 9 is a schematic cross-sectional view of a cover panel according to modification 1A, showing an example structure.

In the decorative sheet 8 and the cover panel 10 shown in FIGS. 3, 10, 12, 14, 15, and 17 and the decorative sheet 9 shown in FIG. 9, the front absorbing pigment 22 in the front color-adjustment layer 12 reduces pearly luster of the pattern 100 created by the interference pigment 21. The front color-adjustment layer 12, which reduces spectral components in a predetermined range, can reduce the likelihood that the viewer perceives a change in the color tone of the pattern 100 when viewing the pattern 100 at different angles.

Figure 21A:
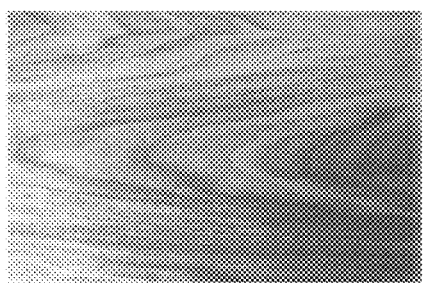
FIG. 21A is a captured image of a cover panel with no front color-adjustment layer, showing the pattern on the cover panel as viewed from the front.
Figure 21B:
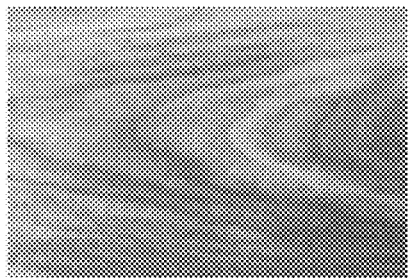
FIG. 21B is a captured image of the cover panel with no front color-adjustment layer, showing the pattern on the cover panel as viewed diagonally.
Figure 22A:
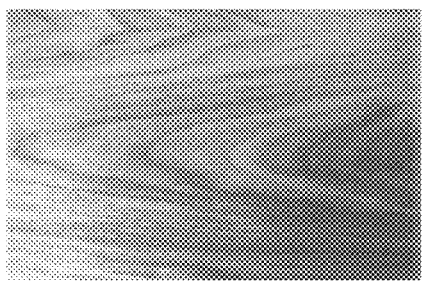
FIG. 22A is a captured image of a cover panel with the front color-adjustment layer, showing the pattern on the cover panel as viewed from the front.
Figure 22B:
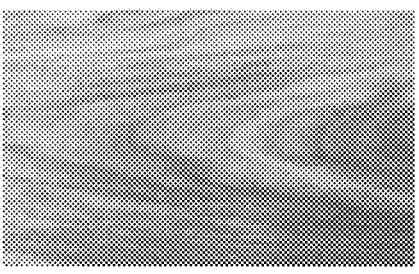
FIG. 22B is a captured image of the cover panel with the front color-adjustment layer, showing the pattern on the cover panel as viewed diagonally.

For example, FIG. 21A is a captured image of a cover panel 10 with no front color-adjustment layer 12, showing the pattern on the cover panel 10 as viewed from the front. FIG. 21B is a captured image of the cover panel 10 with no front color-adjustment layer 12, showing the pattern on the cover panel 10 as viewed diagonally. FIG. 22A is a captured image of a cover panel 10 with the front color-adjustment layer 12, showing the pattern on the cover panel 10 as viewed from the front. FIG. 22B is a captured image of the cover panel 10 with the front color-adjustment layer 12, showing the pattern on the cover panel 10 as viewed diagonally. The comparison between FIG. 21B and FIG. 22B shows that the front color-adjustment layer reduces pearly luster of the pattern.

(5-2)

In the decorative sheet 8 and the cover panel 10 shown in FIGS. 3, 12, and 15 and the decorative sheet 9 shown in FIG. 9, the light transmitted from the back surface 13$b$ to the front surface 13$a$ of the patterned layer 13 can be colored by the front color-adjustment layer 12 and can have a color shifted from the light source color or have a tint unintended by the user. In response to this, the back absorbing pigment 23 in the back color-adjustment layer 14 changes the color of light transmitted through the back color-adjustment layer 14 and the front color-adjustment layer 12 to be closer to an achromatic color than the color of light transmitted through the front color-adjustment layer 12 excluding the back color-adjustment layer 14. The back color-adjustment layer 14 can thus reduce unintended coloration caused by the front color-adjustment layer 12.

Figure 23A:
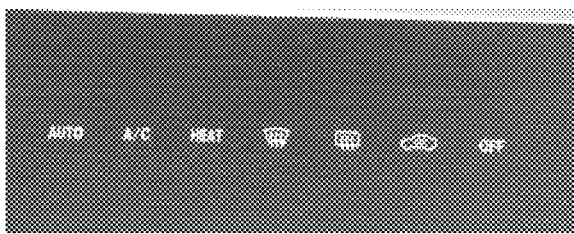
FIG. 23A is a captured image of a cover panel with the back color-adjustment layer, showing icons on the cover panel.
Figure 23B:
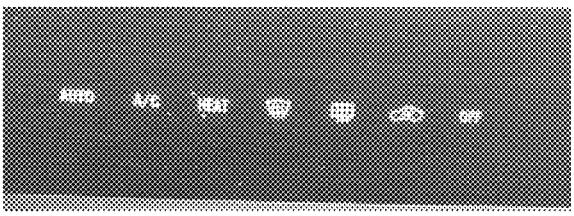
FIG. 23B is a captured image of a cover panel with no back color-adjustment layer, showing icons on the cover panel.

For example, FIG. 23A is a captured image of a cover panel with the back color-adjustment layer 14, showing icons on the cover panel. FIG. 23B is a captured image of a cover panel with no back color-adjustment layer 14, showing icons on the cover panel. The comparison between FIG. 23A and FIG. 23B shows that the back color-adjustment layer reduces unintended coloration caused by the front color-adjustment layer.

(5-3)

As described with reference to FIG. 6, the decorative sheet 8 or 9 may include the front color-adjustment layer 12 and the back color-adjustment layer 14 having complementary colors. This allows light transmitted through the back color-adjustment layer 14 and the front color-adjustment layer 12 to have an achromatic color. In this structure, the back color-adjustment layer 14 can reduce unintended coloration of the light transmitted from the back surface 13$b$ to the front surface 13$a$ of the patterned layer 13.

(5-4)

As described with reference to FIG. 7, the back absorbing pigment 23 has light-absorbing properties to cause light transmitted through, for example, the back color-adjustment layer 14, the patterned layer 13, and the front color-adjustment layer 12 at a predetermined position (e.g., the position of the icons 110) to be indicated by a point (x, y) satisfying $0.28 \leq x \leq 0.36$ and $0.28 \leq y \leq 0.36$ on the xy chromaticity diagram. In the decorative sheet 8 or 9 including the back color-adjustment layer 14, the patterned layer 13, and the front color-adjustment layer 12 shown in FIG. 7, the white light transmitted from the back surface 13$b$ to the front surface 13$a$ of the patterned layer 13 can be colored in a color other than white by the front color-adjustment layer 12. In response to this, the back absorbing pigment 23 causes the light of the icons 110 transmitted through the back color-adjustment layer 14, the patterned layer 13, and the front color-adjustment layer 12 to be indicated by a point (x, y) satisfying $0.28 \leq x \leq 0.36$ and $0.28 \leq y \leq 0.36$ on the xy chromaticity diagram. This reduces coloration, in a color other than white, of the light of the icons 110 (an example of light transmitted at a predetermined position) transmitted through the back color-adjustment layer 14, the patterned layer 13, and the front color-adjustment layer 12.

(5-5)

In the decorative sheet 8 shown in FIGS. 11, 13, and 16, the white light transmitted from the back surface 13$b$ to the front surface 13$a$ of the patterned layer 13 can be colored in the ground color of the patterned layer 13. In response to this, the back absorbing pigment 23 causes light transmitted through the back color-adjustment layer 14 and the patterned layer 13 at a predetermined position (e.g., the position of the icons 110) to be indicated by a point (x, y) satisfying $0.28 \le x \le 0.36$ and $0.28 \le y \le 0.36$ on the xy chromaticity diagram. This reduces coloration, in a color other than white, of light transmitted through the back color-adjustment layer 14 and the patterned layer 13.

Similarly to the decorative sheet 8 shown in FIGS. 11, 13, and 16, the decorative sheet 9 for transfer may eliminate the front color-adjustment layer 12. Such a decorative sheet 9 has the same or similar effects as the decorative sheets 8 shown in FIGS. 11, 13, and 16.

(5-6)

For example, the back absorbing pigment 23 shown in FIG. 2 has light-absorbing properties to cause light transmitted to the front at a predetermined position (e.g., to the front surface 10a at the position of the icons 110) to be indicated by a point (x, y) satisfying $0.28 \le x \le 0.36$ and $0.28 \le y \le 0.36$ on the xy chromaticity diagram. In the cover panel 10 in FIG. 2, the white light transmitted from the back surface 13b to the front surface 13a of the patterned layer 13 can be colored in a color other than white by, for example, the molded member 17, the back color-adjustment layer 14, the patterned layer 13, and the front color-adjustment layer 12. In response to this, the back absorbing pigment 23 causes the light of the icons 110 (an example of light transmitted to the front at a predetermined position) to be indicated by a point (x, y) satisfying $0.28 \le x \le 0.36$ and $0.28 \le y \le 0.36$ on the xy chromaticity diagram. This reduces coloration, in a color other than white, of light transmitted through the cover panel 10.

(5-7)

For example, the back absorbing pigment shown in FIG. 11 has light-absorbing properties to cause light transmitted to the front at a predetermined position (e.g., to the front surface 10a at the position of the icons 110) to be indicated by a point (x, y) satisfying $0.28 \le x \le 0.36$ and $0.28 \le y \le 0.36$ on the xy chromaticity diagram. In the cover panel 10 in FIG. 11, the white light transmitted from the back surface 13b to the front surface 13a of the patterned layer 13 can be colored in a color other than white by, for example, the molded member 17, the back color-adjustment layer 14, and the patterned layer 13. In response to this, the back absorbing pigment 23 causes the light of the icons 110 (an example of light transmitted to the front at a predetermined position) to be indicated by a point (x, y) satisfying $0.28 \le x \le 0.36$ and $0.28 \le y \le 0.36$ on the xy chromaticity diagram. This reduces coloration, in a color other than white, of light transmitted through the cover panel 10.

(5-8)

The cover panel 10 may have a light transmittance of 10 to 70% inclusive at the position at which the patterned layer 13 is located. This prevents the internal components covered with the cover panel 10 from being visible through the patterned layer 13 to the viewer of the pattern 100. More specifically, the cover panel 10 may have a light transmittance of 10 to 70% inclusive at the position with no shielding layer 15 (e.g., at the position of the openings 15a for the icons 110). This allows the incident light IL2 incident on the back surface 10b of the cover panel 10 to be transmitted at an intensity sufficient to display the icons 110, and also reduces the likelihood that the inside of the cover panel 10 is visible through the openings 15a for the icons 110.

(5-9)

The back absorbing pigment 23 shown in FIGS. 2 and 20 has light-absorbing properties to cause light transmitted to the front at a predetermined position (e.g., to the front surface 10a at the position of the icons 110 or the display screen 55) to be indicated by a point (x, y) satisfying $(x1-0.03) \le x \le (x1+0.03)$ and $(y1-0.03) \le y \le (y1+0.03)$ on the xy chromaticity diagram, where a point (x1, y1) indicates the color of the light source 2 or the display 51 on the xy chromaticity diagram.

In the display device 50 with this structure, the light transmitted from the back surface 13b to the front surface 13a of the patterned layer 13 can be colored by, for example, the molded member 17, the back color-adjustment layer 14, the patterned layer 13, and the front color-adjustment layer 12 and can have a color shifted from the color of light from the light source. In response to this, the back absorbing pigment 23 causes the light of the icons 110 or the display screen 55 (an example of light transmitted to the front at a predetermined position) to be indicated by a point (x, y) satisfying $(x1-0.03) \le x \le (x1+0.03)$ and $(y1-0.03) \le y \le (y1+0.03)$ on the xy chromaticity diagram. This reduces the likelihood that the color of light of, for example, the icons 110 or the display screen is shifted from the color of light from the light source 2 or from the display 51.

(5-10)

The back absorbing pigment 23 shown in FIG. 11 has light-absorbing properties to cause light transmitted to the front at a predetermined position (e.g., to the front surface 10a at the position of the icons 110) to be indicated by a point (x, y) satisfying $(x1-0.03) \le x \le (x1+0.03)$ and $(y1-0.03) \le y \le (y1+0.03)$ on the xy chromaticity diagram, where a point (x1, y1) indicates the color of the light source 2 on the xy chromaticity diagram.

In the display device 50 with this structure, the light transmitted from the back surface 13b to the front surface 13a of the patterned layer 13 can be colored by the molded member 17, the back color-adjustment layer 14, and the patterned layer 13 and can have a color shifted from the color of light from the light source. In response to this, the back absorbing pigment 23 causes the light of the icons 110 (an example of light transmitted to the front at a predetermined position) to be indicated by a point (x, y) satisfying $(x1-0.03) \le x \le (x1+0.03)$ and $(y1-0.03) \le y \le (y1+0.03)$ on the xy chromaticity diagram. This reduces the likelihood that the color of the icons 110 is shifted from the color of light from the light source 2.

(5-11)

The display device 50 shown in FIG. 20 includes the optically clear adhesive 52 between the molded member 17 and the display 51 with no space between them, thus avoiding the molded member 17 facing an air gap. The display device 50 thus includes no interface between the molded member 17 and an air gap that can reflect the incident light IL1 incident on the front surface 13a of the patterned layer 13. This reduces the likelihood that the edge of the shielding layer 15, or the outer frame, is visible with light reflected at an interface with an air gap when the display 51 emits no light.

Although the first embodiment, the modifications, and the second embodiment of the present invention have been described, the present invention is not limited to the embodiments and the modifications, and may be changed in various manners without departing from the spirit and scope of the present invention. The embodiments and the modifications described herein may be combined in any manner as appropriate.

REFERENCE CHARACTER LIST 2 light source
8, 9 decorative sheet
10 cover panel
12 front color-adjustment layer
13 patterned layer
14 back color-adjustment layer
15 shielding layer (example of outer frame)
17 molded member
18, 19 base film
21 interference pigment
22 front absorbing pigment
23 back absorbing pigment
30 metallic layer
50 display device
51 display
52 optically clear adhesive

The invention claimed is:

1. A decorative sheet, comprising:
a patterned layer having a pattern comprising an interference pigment to produce a color by interference of light reflected after being incident on a front surface of the patterned layer, the patterned layer being configured to transmit light from a back surface to the front surface of the patterned layer;
a front color-adjustment layer covering the front surface of the patterned layer and configured to transmit light; and
a base film supporting the patterned layer and the front color-adjustment layer, wherein
the front color-adjustment layer comprises particles of a front absorbing pigment dispersed uniformly across the front color-adjustment layer, and the front color-adjustment layer with the front absorbing pigment reduces a spectral component in a predetermined wavelength range of light transmitted through the front color-adjustment layer,
first incident light is incident on the front surface and reflected by the interference pigment as first reflected light, and second incident light is incident on the front surface and reflected by the interference pigment as second reflected light,
a reflection angle of the second incident light and the second reflected light is greater than a reflection angle between the first incident light and the first reflected light, and
when the second reflected light includes a lower spectral component of a predetermined color than the first reflected light, the predetermined wavelength range is other than a range of the spectral component of the predetermined color.

2. The decorative sheet according to claim 1, further comprising:
a back color-adjustment layer covering the back surface of the patterned layer and configured to transmit light, wherein
the back color-adjustment layer comprises particles of a back absorbing pigment dispersed uniformly across the back color-adjustment layer, and
the back absorbing pigment has a light-absorbing property to cause light transmitted through the back color-adjustment layer and the front color-adjustment layer to have a color closer to an achromatic color than light transmitted through the front color-adjustment layer excluding the back color-adjustment layer.

3. The decorative sheet according to claim 1, further comprising:
a back color-adjustment layer covering the back surface of the patterned layer and configured to transmit light, wherein
the back color-adjustment layer comprises particles of a back absorbing pigment dispersed uniformly across the back color-adjustment layer, and
the front color-adjustment layer and the back color-adjustment layer have complementary colors.

4. The decorative sheet according to claim 1, further comprising:
a back color-adjustment layer covering the back surface of the patterned layer and configured to transmit light, wherein
the back color-adjustment layer comprises particles of a back absorbing pigment dispersed uniformly across the back color-adjustment layer, and
the back absorbing pigment has a light-absorbing property to cause light transmitted through the back color-adjustment layer, the patterned layer, and the front color-adjustment layer at a predetermined position to be indicated by a point (x, y) satisfying $0.28 \leq x \leq 0.36$ and $0.28 \leq y \leq 0.36$ on an xy chromaticity diagram.

5. The decorative sheet according to claim 4, wherein the base film supports the back color-adjustment layer.

6. A cover panel, comprising:
a patterned layer having a pattern comprising an interference pigment to produce a color by interference of light reflected after being incident on a front surface of the patterned layer, the patterned layer being configured to transmit light from a back surface to the front surface of the patterned layer;
a front color-adjustment layer covering the front surface of the patterned layer and configured to transmit light; and
a molded member supporting the patterned layer and the front color-adjustment layer, the molded member being configured to transmit light, wherein
the front color-adjustment layer comprises particles of a front absorbing pigment dispersed uniformly across the front color-adjustment layer, and the front color-adjustment layer with the front absorbing pigment reduces a spectral component in a predetermined wavelength range of light transmitted through the front color-adjustment layer,
first incident light is incident on the front surface and reflected by the interference pigment as first reflected light, and second incident light is incident on the front surface and reflected by the interference pigment as second reflected light,
a reflection angle between the second incident light and the second reflected light is greater than a reflection angle between the first incident light and the first reflected light, and
when the second reflected light includes a lower spectral component of a predetermined color than the first reflected light, the predetermined wavelength range is other than a range of the spectral component of the predetermined color.

7. The cover panel according to claim 6, further comprising:
a back color-adjustment layer covering the back surface of the patterned layer and configured to transmit light, wherein the back color-adjustment layer comprises particles of a back absorbing pigment dispersed uniformly across the back color-adjustment layer, and the back absorbing pigment has a light-absorbing property to cause light transmitted to a front of the cover panel at a predetermined position to be indicated by a point (x, y) satisfying $0.28 \leq x \leq 0.36$ and $0.28 \leq y \leq 0.36$ on an xy chromaticity diagram.

8. The cover panel according to claim 7, wherein
the molded member supports the back color-adjustment layer.

9. A display device, comprising:
a patterned layer having a pattern comprising an interference pigment to produce a color by interference of light reflected after being incident on a front surface of the patterned layer, the patterned layer being configured to transmit light from a back surface to the front surface of the patterned layer;
a back color-adjustment layer covering the back surface of the patterned layer and configured to transmit light;
a molded member supporting the patterned layer and the back color-adjustment layer, the molded member being configured to transmit light; and
a light source configured to emit light to be transmitted through the molded member, the back color-adjustment layer, and the patterned layer,
wherein the back color-adjustment layer comprises particles of a back absorbing pigment dispersed uniformly across the back color-adjustment layer, and
the back absorbing pigment has a light-absorbing property to cause light transmitted to a front of the display device at a predetermined position to be indicated by a point (x, y) satisfying $(x1-0.03) \leq x \leq (x1+0.03)$ and $(y1-0.03) \leq y \leq (y1+0.03)$ on an xy chromaticity diagram, where a point (x1, y1) indicates a color of the light source on the xy chromaticity diagram.

10. The display device according to claim 9, comprising:
a front color-adjustment layer covering the front surface of the patterned layer and configured to transmit light, wherein
the molded member supports the front color-adjustment layer
the light source is further configured to emit the light to be transmitted through the front color-adjustment layer, and
the front color-adjustment layer comprises particles of a front absorbing pigment dispersed uniformly across the front color-adjustment layer, and the front color-adjustment layer with the front absorbing pigment reduces a spectral component in a predetermined wavelength range of light transmitted through the front color-adjustment layer.

11. The display device according to claim 9, further comprising:
a display including the light source;
an outer frame located between the display and the patterned layer along an outer edge of the display to block light; and
an optically clear adhesive filling a space between the molded member and the display, wherein
the back absorbing pigment has a light-absorbing property to cause light transmitted through light-transmissive members located frontward from the optically clear adhesive to have a color closer to an achromatic color than light transmitted through the light-transmissive members excluding the back color-adjustment layer.

* * * * *